(12) United States Patent
Kim et al.

(10) Patent No.: US 12,407,923 B2
(45) Date of Patent: Sep. 2, 2025

(54) IMAGE SENSOR AND OPERATING METHOD OF IMAGE SENSOR

(71) Applicant: Samsung Electronics Co., Ltd., Suwon-si (KR)

(72) Inventors: Junho Kim, Suwon-si (KR); Jae-Heung Lim, Suwon-si (KR); Gihoan Cho, Suwon-si (KR); Sunyong Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 164 days.

(21) Appl. No.: 18/456,017

(22) Filed: Aug. 25, 2023

(65) Prior Publication Data

US 2024/0305899 A1 Sep. 12, 2024

(30) Foreign Application Priority Data

Mar. 6, 2023 (KR) ........................ 10-2023-0029411

(51) Int. Cl.
*H04N 23/60* (2023.01)
*H04N 23/667* (2023.01)
(Continued)

(52) U.S. Cl.
CPC ......... *H04N 23/665* (2023.01); *H04N 23/667* (2023.01); *H04N 23/80* (2023.01); *H04N 25/79* (2023.01)

(58) Field of Classification Search
None
See application file for complete search history.

(56) References Cited

U.S. PATENT DOCUMENTS

| 7,512,021 B2 | 3/2009 | Houda et al. |
| 9,083,845 B2 | 7/2015 | Gray |

(Continued)

FOREIGN PATENT DOCUMENTS

| CN | 114064129 A | 2/2022 |
| JP | 2003-116044 A | 4/2003 |

(Continued)

OTHER PUBLICATIONS

1/3-inch CMOS Digital Image Sensor, AR0130CS, Onsemi, Mar. 2023—Rev. 16.

*Primary Examiner* — Paul M Berardesca
(74) *Attorney, Agent, or Firm* — Harness, Dickey & Pierce, P.L.C.

(57) ABSTRACT

An image sensor includes a pixel array including pixels, an image data generation circuit configured to generate first image data based on signals of the pixels and output the first image data, and an image data translation circuit configured to generate second image data based on translating the first image data and outputting the second image data to an external host device. The image data generation circuit has a vertical blank interval and a frame interval alternately, is configured to not output the first image data during the vertical blank interval, and is configured to output one frame of the first image data during the frame interval. The image data translation circuit is configured to perform a preparation operation to translate a frame of the first image data into a frame of the second image data in a next frame interval, during the vertical blank interval.

20 Claims, 19 Drawing Sheets

(51) Int. Cl.
*H04N 23/80* (2023.01)
*H04N 25/79* (2023.01)

(56) References Cited

U.S. PATENT DOCUMENTS

| | | |
|---|---|---|
| 9,251,553 B2 | 2/2016 | Rao et al. |
| 9,507,500 B2 | 11/2016 | Wigdor et al. |
| 2004/0223066 A1* | 11/2004 | Bryant .................. H04N 25/76 348/308 |
| 2015/0208022 A1* | 7/2015 | Staudenmaier .......... H04N 5/91 348/715 |
| 2016/0010990 A1* | 1/2016 | McGarry ............... H04N 25/00 348/46 |
| 2024/0098387 A1* | 3/2024 | Chang ................... H04N 23/57 |

FOREIGN PATENT DOCUMENTS

| | | |
|---|---|---|
| JP | 4073654 B2 | 4/2008 |
| JP | 2020-191520 A | 11/2020 |

* cited by examiner

IMAGE SENSOR AND OPERATING METHOD OF IMAGE SENSOR

CROSS-REFERENCE TO RELATED APPLICATIONS

This application claims priority under 35 U.S.C. § 119 to Korean Patent Application No. 10-2023-0029411 filed on Mar. 6, 2023, in the Korean Intellectual Property Office, the disclosures of which are incorporated by reference herein in their entireties.

BACKGROUND

Example embodiments of the present inventive concepts described herein relate to electronic devices, and more particularly, relate to image sensors adaptively responding to a setting change and operating methods of the image sensors.

An image sensor may be mounted in various types of electronic devices. For example, an electronic device that includes the image sensor may be included as a component of various types of electronic devices such as a smartphone, a tablet personal computer (PC), a laptop PC, and a wearable device.

The image sensor obtains image information about an external object by converting a light reflected from the external object into an electrical signal. The electronic device including the image sensor may display an image in a display panel by using the obtained image information.

The image sensor may generate an image based on various settings. For example, the image sensor may adjust an exposure time, an auto focus, a white balance, etc., based on various settings. Also, the image sensor may perform various correction (or compensation) operations on the image based on various settings and may apply various filters to the image.

SUMMARY

Some example embodiments of the present inventive concepts provide an image sensor configured to reduce a time or power consumption necessary for changing settings and/or an operating method of the image sensor.

According to some example embodiments, an image sensor may include a pixel array that includes a plurality of pixels, an image data generation circuit that is configured to generate first image data based on signals of the plurality of pixels and to output the first image data, and an image data translation circuit that is configured to generate second image data based on translating the first image data and to output the second image data to an external host device. The image data generation circuit may be configured to operate in a vertical blank interval and a frame interval alternately, may be configured to not output the first image data during the vertical blank interval, and may be configured to output one frame of the first image data during the frame interval. The image data translation circuit may be configured to perform a preparation operation associated with translating a frame of the first image data into a frame of the second image data in a next frame interval, during the vertical blank interval. When setting information is received from the external host device, the image data translation circuit may be configured to a timing to start a next preparation operation.

According to some example embodiments, an image sensor may include a pixel array that includes a plurality of pixels, an image data generation circuit that is configured to generate first image data based on signals of the plurality of pixels and to output the first image data, and an image data translation circuit that is configured to generate second image data based on translating the first image data and outputs the second image data to an external host device. The image data generation circuit may be configured to operate in a vertical blank interval and a frame interval alternately, may be configured to not output the first image data during the vertical blank interval, and may be configured to output one frame of the first image data during the frame interval. The image data translation circuit may be configured to perform a preparation operation associated with translating a frame of the first image data into a frame of the second image data in a next frame interval, the preparation operation performed during the vertical blank interval. When mode information is received from the external host device, the image data translation circuit may be configured to enter one of a first mode or a second mode. In the first mode, when setting information is received from the external host device, the image data translation circuit may be configured to adjust a timing to start a next preparation operation. In the second mode, when the setting information is received from the external host device, the image data translation circuit may be configured to maintain the timing to start the next preparation operation.

According to some example embodiments, an operating method of an image sensor which includes a pixel array, an image data generation circuit, and an image data translation circuit may include generating, at the pixel array, signals, generating, at the image data generation circuit, first image data from the signals of the pixel array, and generating, at the image data translation circuit, second image data based on translating the first image data. The generating of the second image data may include performing, at the image data translation circuit, a preparation operation in a vertical blank interval, and receiving, at the image data translation circuit, the first image data in a frame interval and generating the second image data based on translating the first image data, based on the preparation operation. When setting information is received from an external host device, the image data translation circuit may be configured to adjust a timing to start the preparation operation.

BRIEF DESCRIPTION OF THE DRAWINGS

The above and other objects and features of the present inventive concepts will become apparent by describing in detail some example embodiments thereof with reference to the accompanying drawings.

DETAILED DESCRIPTION

Below, some example embodiments of the present inventive concepts will be described in detail and clearly to such an extent that one having ordinary skill in the relevant art easily carries out the present inventive concepts.

Figure 1:
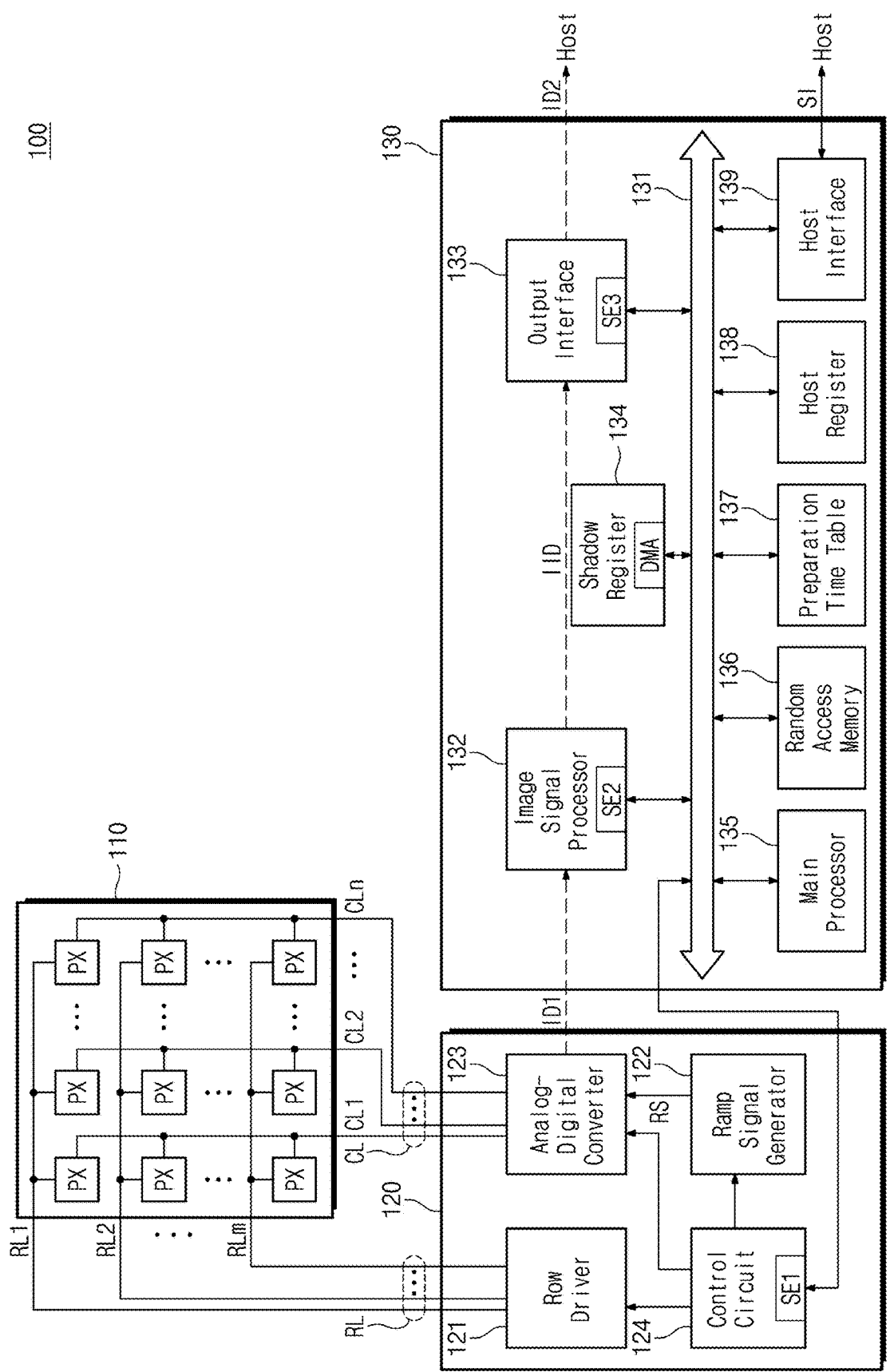
FIG. 1 illustrates an image sensor according to some example embodiments of the present inventive concepts.

FIG. 1 illustrates an image sensor 100 according to some example embodiments of the present inventive concepts. Referring to FIG. 1, the image sensor 100 may include a pixel array 110, an image data generation circuit 120, and an image data translation circuit 130.

The pixel array 110 may include a plurality of pixels PX arranged in rows and columns in the form of a matrix. The rows of the pixels PX may be connected to row lines RL including first to m-th row lines RL1 to RLm (m being a positive integer). The columns of the pixels PX may be connected to column lines CL including first to n-th column lines CL1 to CLn (n being a positive integer).

Each of the plurality of pixels PX may include a photo detector(s). For example, the photo detector may include a photodiode, a photo transistor, a photo gate, or a pinned photodiode. Each of the plurality of pixels PX may sense a light by using the photo detector and may translate the sensed light amount into an electrical signal, for example, a voltage or a current.

A color filter array (CFA) and a lens may be stacked on/over the pixel array 110. The color filter array may include red, green, and blue color filters. Two or more different color filters may be disposed at the plurality of pixels PX. For example, at least one blue color filter, at least one red color filter, and at least two green color filters may be disposed at the plurality of pixels PX.

The image data generation circuit 120 may perform a first image translation operation of translating signals of the pixels PX into first image data ID1. The image data generation circuit 120 may include a row driver 121, a ramp signal generator 122, an analog-to-digital converter 123, and a control circuit 124.

The row driver 121 may be connected to the rows of the pixels PX of the pixel array 110 through the first to m-th row lines RL1 to RLm. The row driver 121 may decode an address and/or a control signal generated by the control circuit 124. Depending on a result of the decoding, the row driver 121 may sequentially select the first to m-th row lines RL1 to RLm of the pixel array 110 and may drive the selected row line with a specific voltage. For example, the row driver 121 may drive the selected row line with a voltage appropriate for sensing a light.

Each of the first to m-th row lines RL1 to RLm connected to the rows of the pixels PX may include two or more lines. The two or more lines may respectively transfer, for example, various signals including a signal for selecting (activating) photo detectors of a pixel, a signal for resetting a floating diffusion node, a signal for selecting a column line, a signal for adjusting a translation gain, etc.

The ramp signal generator 122 may generate a ramp signal RS. The ramp signal generator 122 may operate under control of the control circuit 124. For example, the ramp signal generator 122 may operate in response to control signals such as a ramp enable signal and a mode signal. In response to a determination that the ramp enable signal is activated, the ramp signal generator 122 may generate the ramp signal RS having a slope that is set based on the mode signal. For example, the ramp signal generator 122 may generate the ramp signal RS that continuously decreases or increases from an initial level over time.

The analog-to-digital converter 123 may be connected to the columns of the pixels PX of the pixel array 110 through the first to n-th column lines CL1 to CLn. The analog-to-digital converter 123 may include current sources and analog-to-digital converters respectively connected to the first to n-th column lines CL1 to CLn. The current sources may be connected between a ground node to which a ground voltage is applied and the first to n-th column lines CL1 to CLn. The current sources may be designed to allow constant currents to flow through the first to n-th column lines CL1 to CLn. While the constant currents flow from the current sources, the pixels PX belonging to a selected row line among the first to m-th row lines RL1 to RLm may output pixel voltages corresponding to the intensity of incident light to the first to n-th column lines CL1 to CLn.

The analog-to-digital converters may receive the ramp signal RS from the ramp signal generator 122 in common. The analog-to-digital converters may compare voltages of the first to n-th column lines CL1 to CLn with the ramp signal RS. The ramp signal RS refers to a signal that decreases (or increases) at a given rate. The analog-to-digital converters may latch count values obtained by performing a count operation until the ramp signal RS is smaller (or greater) than voltages of the first to n-th column lines CL1 to CLn and may convert and output the latched count values into digital values.

That is, the analog-to-digital converters may output the digital values corresponding to magnitudes of the voltages (or amounts of currents) that are output from the pixels PX to the first to n-th column lines CL1 to CLn. In some example embodiments, the analog-to-digital converters may output digital values of initial voltages of the first to n-th column lines CL1 to CLn and digital values of pixel voltages corresponding to the intensity of incident light as the first image data ID1.

When the pixels PX of the first to m-th row lines RL1 to RLm are sequentially selected, the analog-to-digital converter 123 may output digital values corresponding to signals transferred from the pixels PX of each row line as line data. The analog-to-digital converter 123 may output digital values corresponding to signals of the pixels PX of the first to m-th row lines RL1 to RLm as a frame.

That is, the analog-to-digital converter 123 may output the first image data ID1 in units of a frame corresponding to the pixels PX of the row lines RL. A frame may include a plurality of line data respectively corresponding to the first to m-th row lines RL1 to RLm. Two line data adjacent to each other may be distinguished by a horizontal blank period where image data are not transferred. Two frames adjacent to each other may be distinguished by a vertical blank interval where image data are not transferred. The image data generation circuit 120 may be configured to operate in alternating vertical blank intervals and frame intervals (also referred to herein as frame periods), where the image data generation circuit 120 is configured to not output first image data ID1 during each vertical blank interval and is configured to output one frame of the first image data ID1 during each frame interval.

The control circuit 124 may control timings at which the image data generation circuit 120 operates. The control circuit 124 may control timings at which the row driver 121 sequentially selects the first to m-th row lines RL1 to RLm and may control timings at which signals are transferred through two or more lines included in a row line selected from the first to m-th row lines RL1 to RLm.

The control circuit 124 may control timings at which the ramp signal generator 122 generates the ramp signal RS and initializes the ramp signal RS. The control circuit 124 may control timings at which the analog-to-digital converters start a count operation and a compare operation and timings at which the analog-to-digital converters are initialized.

The control circuit 124 may include a first storage element SE1. As described herein, a "storage element" may be referred to interchangeably as a storage device, a memory device, a memory, or the like. The first storage element SE1 may store various settings that are applied when the image data generation circuit 120 converts signals of the pixels PX to generate the first image data ID1. For example, the settings stored in the first storage element SE1 may be used to perform various operations such as a compensation operation for reducing the noise or distortion of the first image data ID1, an enhancement operation for enhancing the quality of image data, a filtering operation for applying various filters to the first image data ID1, and a request operation for generating image data corresponding to a request of an external host device (e.g., a command received from an external host device that may include, for example, a user interface, processing circuitry, or the like of an electronic device that includes the image sensor 100).

For example, the first storage element SE1 may store various settings such as a setting for a length of a time (e.g., an effective integration time) during which the row driver 121 exposes the plurality of pixels PX, settings for a gain and an offset of the analog-to-digital converters of the analog-to-digital converter 123, a setting for a frame rate, and a setting for binning where signals (or digital values) of the pixels PX are summed for each group of the pixels PX. For example, the first storage element SE1 may be a register. The settings stored in the first storage element SE1 may be updated by the image data translation circuit 130.

In some example embodiments, the image data generation circuit 120 may further include a line buffer. The line buffer may be used to buffer the line data output from the analog-to-digital converter 123.

The image data translation circuit 130 may receive the first image data ID1 from the image data generation circuit 120. The image data translation circuit 130 may receive setting information SI from the external host device. The image data translation circuit 130 may generate second image data ID2 by converting the first image data ID1 based on the setting information SI. The image data translation circuit 130 may output the second image data ID2 to the external host device.

A second image translation operation in which the first image data ID1 are translated into the second image data ID2 may include various operations such as a compensation operation for reducing the noise or distortion of the first image data ID1, an enhancement operation for enhancing the quality of image data, a motion application operation for applying a motion of a target in image data, a filtering operation for applying various filters to image data, and a request operation for generating image data corresponding to a request of an external host device.

In some example embodiments, an operation for converting the first image data ID1 into the second image data ID2 may be performed based on various settings stored in the image data generation circuit 120 and the image data translation circuit 130. When there is a need to update various settings, for example, when the external host device changes a mode of generating the second image data ID2, the image data translation circuit 130 may receive the setting information SI from the external host device.

The image data translation circuit 130 may include a bus 131, an image signal processor 132, an output interface 133, a shadow register 134, a main processor 135, a random access memory 136, a preparation time table 137, a host register 138, and a host interface 139. The bus 131 may provide channels between the components of the image data translation circuit 130.

The image signal processor 132 may receive the first image data ID1 from the analog-to-digital converter 123 of the image data generation circuit 120. The image signal processor 132 may generate internal image data IID by performing the first image translation operation (e.g., image processing) as a portion of the image translation operation of the first image data ID1. For example, the first image translation operation (e.g., image processing) may include at least some of various operations including the compensation operation, the enhancement operation, the motion application operation, the filtering operation, and the request operation described above.

The image signal processor 132 may include a second storage element SE2. The second storage element SE2 may store various settings that are applied when the image signal processor 132 converts the first image data ID1 to generate the internal image data IID. For example, the settings stored in the second storage element SE2 may be used to perform various operations including the compensation operation, the enhancement operation, the motion application operation, the filtering operation, and the request operation described above.

For example, the second storage element SE2 may store various settings such as a setting for a frame rate, a setting for binning, a setting for brightness control, settings for noise cancellation schemes, settings for noise cancellation levels, and settings for a filtering kind and a filtering level. For example, the second storage element SE2 may be implemented with a register or may be implemented by using a specific storage space in the random access memory 136. The settings stored in the second storage element SE2 may be updated by the main processor 135 through the bus 131.

In some example embodiments, the image signal processor 132 may include a line buffer. The line buffer may be used to buffer each line data of the first image data ID1 or the internal image data IID.

The output interface 133 may receive the internal image data IID from the image signal processor 132. The output interface 133 may generate the second image data ID2 by performing the second image translation operation (e.g., second image processing), such as a crop operation, as a portion of the image translation operation of the internal image data IID. For example, the second image translation operation (e.g., second image processing) may include at least some of various operations including the compensation operation, the enhancement operation, the motion application operation, the filtering operation, and the request operation described above.

The output interface 133 may include a third storage element SE3. The third storage element SE3 may store various settings that are applied when the output interface 133 converts the internal image data IID to generate the second image data ID2. For example, the settings stored in the third storage element SE3 may be used to perform various operations including the compensation operation, the enhancement operation, the motion application operation, the filtering operation, and the request operation described above.

For example, the third storage element SE3 may store various settings such as a setting for a frame rate, a setting for binning, and settings for a crop operation in which a portion of image data is selected and output. For example, the third storage element SE3 may be implemented with a register or may be implemented by using a specific storage space in the random access memory 136. The settings stored in the third storage element SE3 may be updated by the main processor 135 through the bus 131.

In some example embodiments, the output interface 133 may include a line buffer. The line buffer may be used to buffer each line data of the internal image data IID or the second image data ID2.

In some example embodiments, the output interface 133 may output the second image data ID2 to the external host device based on the MIPI (Mobile Industry Processor Interface) C-PHY or D-PHY.

The shadow register 134 may be a bank of registers. The shadow register 134 may be implemented with a group of independent registers or may be implemented by using a specific storage space in the random access memory 136. The shadow register 134 may be used to temporarily store information of settings to be updated by the setting information SI. For example, information of settings incapable of being currently applied from among the settings to be updated by the setting information SI may be temporarily stored in the shadow register 134 through the bus 131.

The shadow register 134 may include a direct memory access (DMA) (or a DMA controller) or may be coupled to the DMA. The DMA may write the settings (e.g., pieces of information of the settings) stored in the shadow register 134 in components of the image data generation circuit 120 or the image data translation circuit 130.

The main processor 135 may control operations of the image data generation circuit 120 and the image data translation circuit 130. The main processor 135 may process interrupts from the components of the image data translation circuit 130. The main processor 135 may perform various operations for generating the second image data ID2.

For example, when the setting information SI is received from the external host device, to apply the updated setting information SI, the main processor 135 may calculate settings (e.g., pieces of setting information) to be updated in the storage element (e.g., SE1, SE2, or SE3) of the image data generation circuit 120 or the image data translation circuit 130. The main processor 135 may directly write the calculated settings in the storage element (e.g., SE1, SE2, or SE3) of the image data generation circuit 120 or the image data translation circuit 130 or may store the calculated settings in the shadow register 134.

An operation in which the main processor 135 updates settings of a storage element to generate the second image data ID2 (e.g., to configure the image data translation circuit to translate a frame of the first image data ID1 into a frame of the second image data ID2) may be referred to as a "preparation operation". As the main processor 135 performs the preparation operation in the vertical blank interval before a frame period (also referred to herein interchangeably as a "frame interval"), the main processor 135 may control the image data generation circuit 120 and the image data translation circuit 130 such that line data of one frame are output as the second image data ID2 based on the same settings.

The random access memory 136 may be a working memory of the main processor 135. The random access memory 136 may store data that are used in various translation operations such as a compensation operation, an enhancement operation, a motion application operation, a filtering operation, and a request operation. The main processor 135 may calculate settings by using the data stored in the random access memory 136. The main processor 135 may use the random access memory 136 as a computational memory for computing settings.

The preparation time table 137 may include a preparation time, which is necessary for respectively updating the settings of the first storage element SE1, the settings of the second storage element SE2, and the settings of the third storage element SE3 based on the setting information SI, when the setting information SI is received. When a specific setting is updated through the setting information SI, the preparation time table 137 may include a sum of a time necessary (also referred to as a time requirement, a time duration requirement, or the like) for the main processor 135 to update the specific setting, for example, to calculate an update setting (or update data) and a time necessary for the main processor 135 to write the specific setting in the first storage element SE1, the second storage element SE2, or the third storage element SE3. The preparation time table 137 may be a look-up table (LUT) including each setting and a time necessary for updating each setting.

The main processor 135 may determine a time necessary for the preparation operation (e.g., an amount of time required for the preparation operation to be performed) based on the setting information SI and the preparation time table 137 and may adjust a timing to start the preparation operation, for example in response to receiving the setting information from an external host device. By dynamically adjusting a length of a time interval where the preparation operation is performed and the timing to start the preparation operation, the main processor 135 may apply the setting information SI received from the external host device more quickly. As a result, the functionality of the image sensor 100 may be improved, based on the image sensor 100 being configured to adjust settings of the image sensor 100 more quickly based on adjusting the timing to start a next preparation operation in response to receiving the setting information from an external host device. For example, the image sensor 100 may be configured to adjust translation of the first image data ID1 to the second image data ID2 according to the setting information, and thus the image sensor 100 may be configured to output second image data generated according to the received setting information more quickly, based on adjusting the timing to start a next preparation operation in response to receiving the setting information from an external host device. For example, the image sensor 100 may be configured to more quickly adapt and/or respond to requests to adjust (e.g., update) translations of the first image data ID1 to the second image data ID2, based on adjusting the timing to start a next preparation operation in response to receiving the setting information from an external host device.

In some example embodiments, the preparation time table 137 may be stored in a nonvolatile memory such as an electrically erasable and programmable read only memory (EEPROM), a one-time programmable (OTP) memory, or a flash memory. For example, the preparation time table 137 may be provided in the process of manufacturing the image sensor 100. As another example, the preparation time table 137 may be stored in a specific storage space of the random access memory 136. For example, the preparation time table 137 may be received from the external host device through the host interface 139 and may be stored in the random access memory 136.

The host register 138 may store information transferred from the external host device, for example, the setting information SI. The host register 138 may store information to be transferred to the external host device, for example, status information of the image sensor 100. The main processor 135 may read the setting information SI stored in the host register 138. The main processor 135 may write the setting information SI in the host register 138.

The host interface 139 may communicate with the external host device. The host interface 139 may write information received from the external host device, for example, information including the setting information SI in the host register 138. The host interface 139 may provide information written in the host register 138, for example, the status information to the external host device.

In some example embodiments, the host interface 139 may communicate with the external host device based on an inter-integrated circuit (I2C) protocol or a serial peripheral interface (SPI) protocol.

In the above example embodiments, the description is given as the compensation operation, the enhancement operation, the motion application operation, the filtering operation, and the request operation are performed when converting signals of the pixels PX to generate the second image data ID2. However, kinds (e.g., types) of image translation operations applied when generating the second image data ID2 are not limited.

In the above example embodiments, the description is given as various settings such as settings for a gain and an offset of the analog-to-digital converter 123, a setting for a frame rate, a setting for binning, and settings for a crop operation in which a portion of image data is selected and output are able to be applied as a means for performing image translation operations. However, kinds (e.g., types) of settings applied to the image data generation circuit 120 and the image data translation circuit 130 are not limited.

In some example embodiments, the image sensor 100 may be implemented with an upper plate and a lower plate. The upper plate and the lower plate may be implemented with different wafers. The pixel array 110 may be implemented in the upper plate. The image data generation circuit 120 and the image data translation circuit 130 may be implemented in the lower plate. The image sensor 100 may be implemented by coupling the upper plate and the lower plate.

The image data generation circuit 120 may be an analog circuit performing (e.g., configured to perform) an analog-based operation. The image data translation circuit 130 may be a digital circuit performing (e.g., configured to perform) a digital-based operation.

The image signal processor 132 and the output interface 133 of the image data translation circuit 130 may be image translation elements that perform the image translation operation of receiving each frame of image data (e.g., ID1 or IID), processing or translating the received frame, and outputting a result of processing or translating the received frame. A transfer path of each frame is shown by an arrow of a dashed line.

Figure 2:
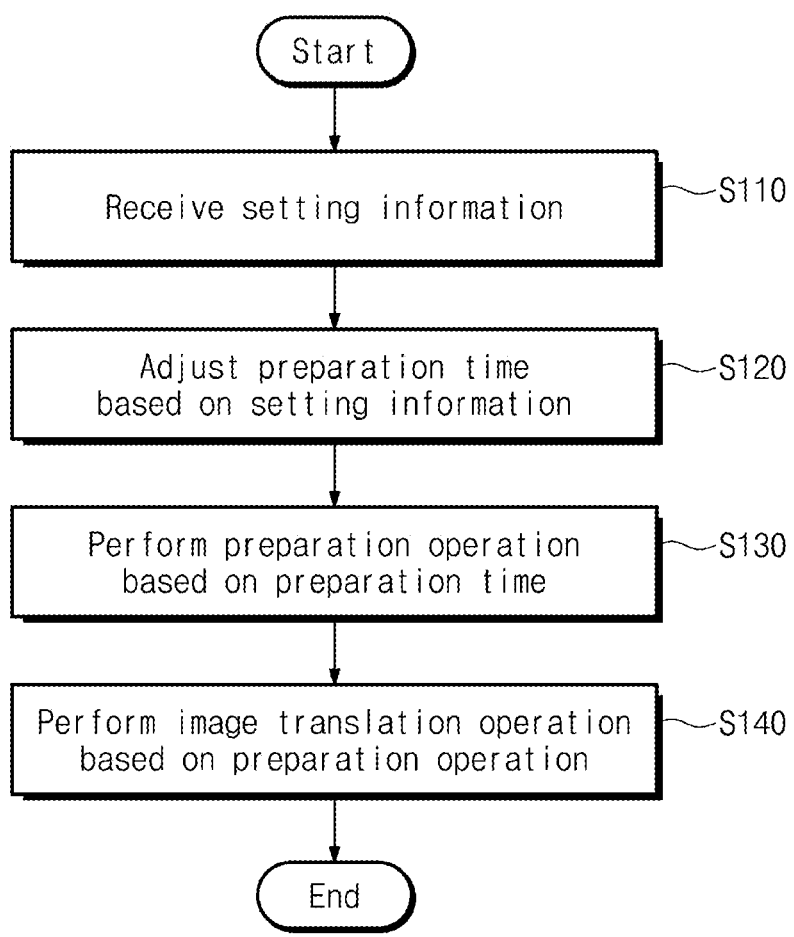
FIG. 2 illustrates an example of an operating method of an image sensor of FIG. 1 according to some example embodiments of the present inventive concepts.

FIG. 2 illustrates an example of an operating method of the image sensor 100 of FIG. 1 according to some example embodiments of the present inventive concepts. Referring to FIGS. 1 and 2, in operation S110, the image sensor 100 may receive the setting information SI. For example, the host interface 139 of the image data translation circuit 130 in the image sensor 100 may receive the setting information SI from the external host device. The host interface 139 may write the setting information SI in the host register 138 through the bus 131.

In operation S120, the image sensor 100 may adjust a preparation time based on the setting information SI. The preparation time may refer to a time that is allocated to perform a next preparation operation. For example, the main processor 135 of the image data translation circuit 130 in the image sensor 100 may read the setting information SI from the host register 138. The main processor 135 may identify a setting(s) targeted for update from among the settings stored in the first storage element SE1, the second storage element SE2, and the third storage element SE3, based on the setting information SI.

The main processor 135 may refer to the preparation time table 137. For example, the main processor 135 may obtain information of an update time(s) corresponding to the setting (s) targeted for update from the preparation time table 137. The main processor 135 may adjust the preparation time based on the update time(s) of the setting(s) targeted for update. For example, the main processor 135 may adjust the preparation time such that the update time(s) of the setting(s) targeted for update is included therein.

For example, when a k-th preparation time is longer than a (k−1)-th preparation time, the main processor 135 may determine that there is a need to increase the preparation time. When the k-th preparation time is shorter than the (k−1)-th preparation time, the main processor 135 may determine that there is a need to decrease the preparation time. When the k-th preparation time is equal to the (k−1)-th preparation time, the main processor 135 may determine that there is a need to maintain the preparation time.

As another example, the main processor 135 may increase the preparation time from a default preparation time. The default preparation time may include a time necessary for performing default preparation operations that the main processor 135 performs every frame as the preparation operation. The main processor 135 may adjust the degree (e.g., magnitude) to which the preparation time is increased from the default preparation time, based on the setting information SI and the preparation time table 137. As the update time(s) becomes longer, the increment may more increase from the default preparation time. As the update time(s) becomes shorter, the preparation time may less increase from the default preparation time.

For example, the default preparation operation may include an operation of checking whether to change the setting information SI, an operation of counting a frame count, an operation of generating a random number, an operation of generating a random noise based on the random number, and an operation of calculating a setting for applying the random noise to the first image data ID1 so as to be set to the image signal processor 132.

In operation S130, the image sensor 100 may perform the preparation operation based on the preparation time. For example, the main processor 135 of the image data translation circuit 130 in the image sensor 100 may start the preparation operation as late as possible, for example such that the preparation operation completes at or approximately at the same time as the start of the next frame interval (e.g., start of frame time). For example, the main processor 135 may start the preparation operation at the latest timing at which the preparation operation is completed in the vertical blank interval before the frame period ("frame interval"). During the preparation operation, the main processor 135 may update a setting(s) targeted for update from among the settings of the first storage element SE1, the second storage element SE2, and the third storage element SE3.

In operation S140, the image sensor 100 may perform the image translation operation based on the preparation operation. The image translation operation may include a first image translation operation and a second image translation operation. For example, the image sensor 100 may translate signals of the pixels PX to generate the second image data ID2. The image data generation circuit 120 and the image data translation circuit 130 of the image sensor 100 may perform the image translation operation based on the settings stored in the first storage element SE1, the second storage element SE2, and the third storage element SE3.

Figure 3:
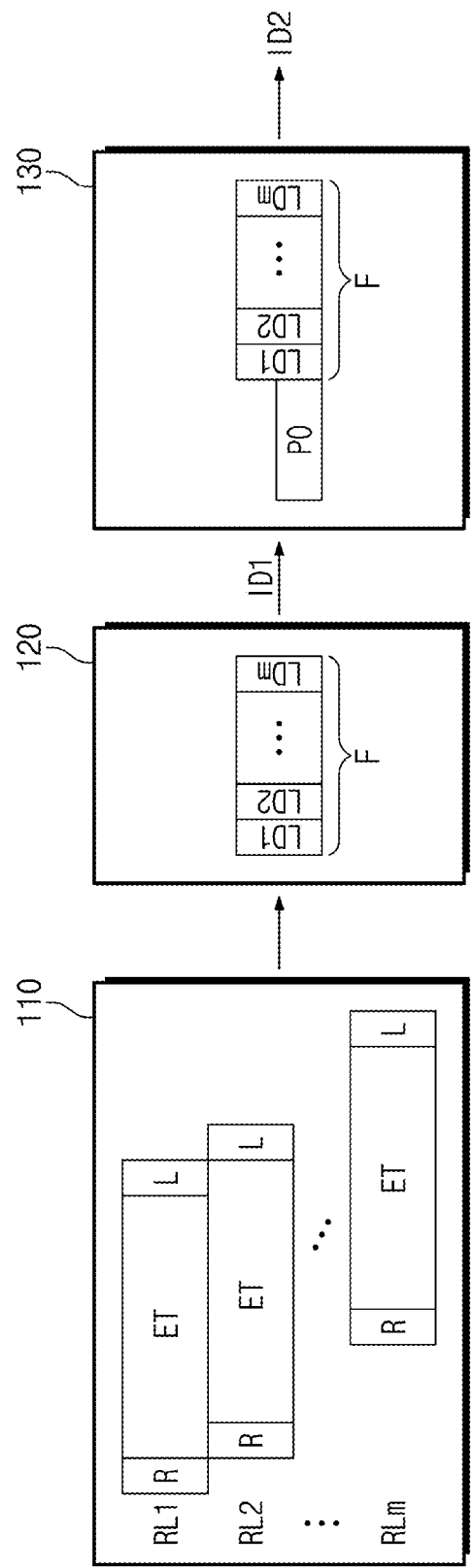
FIG. 3 illustrates examples in which a pixel array, an image data generation circuit, and an image data translation circuit operate according to some example embodiments of the present inventive concepts.

FIG. 3 illustrates examples in which the pixel array 110, the image data generation circuit 120, and the image data translation circuit 130 operate according to some example embodiments of the present inventive concepts. Referring to FIGS. 1 and 3, the first to m-th row lines RL1 to RLm of the pixels PX of the pixel array 110 may be sequentially selected. The pixels PX of each of the first to m-th row lines RL1 to RLm may be reset by a reset signal "R", may generate electrons corresponding to an incident light during an exposure time ET, and may output one line data (e.g., LD) in response to a latch signal "L".

As the first to m-th row lines RL1 to RLm are sequentially selected, the image data generation circuit 120 may sequentially generate first to m-th line data LD1 to LDm respectively corresponding to the first to m-th row lines RL1 to RLm. The first to m-th line data LD1 to LDm may correspond to one frame "F". In some example embodiments, the first to m-th line data LD1 to LDm may be separated from each other by the horizontal blank period. The image data generation circuit 120 may output a frame including the first to m-th line data LD1 to LDm as the first image data ID1.

After performing a preparation operation PO, the image data translation circuit 130 may receive the first to m-th line data LD1 to LDm of the frame "F". The image data translation circuit 130 may translate the first to m-th line data LD1 to LDm of the frame "F" of the first image data ID1 to output the first to m-th line data LD1 to LDm of the frame "F" of the second image data ID2.

Figure 4:
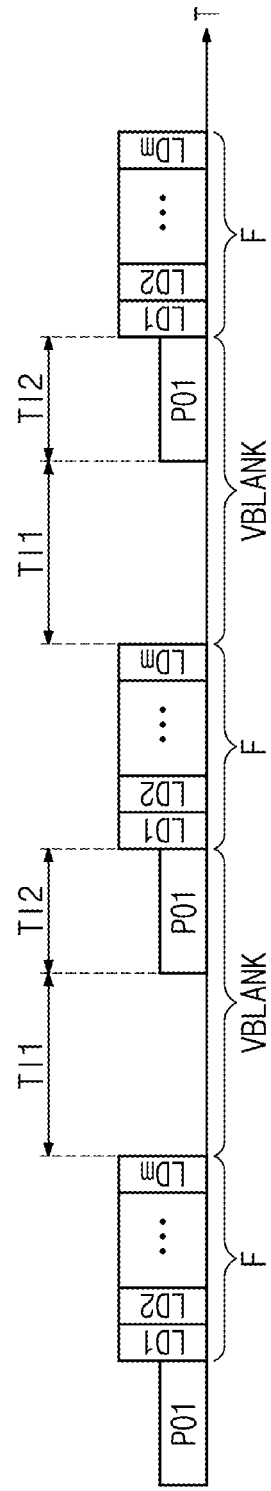
FIG. 4 illustrates a first example of a time window in which an image sensor is capable of coping with setting information of an external host device while the image sensor performs a first preparation operation according to some example embodiments of the present inventive concepts.

FIG. 4 illustrates a first example of a time window in which the image sensor 100 is capable of coping with the setting information SI of the external host device while the image sensor 100 performs a first preparation operation PO1 according to some example embodiments of the present inventive concepts. In FIG. 4, a horizontal axis represents a time "T". An operation of the image sensor 100 over time is illustrated in FIG. 4.

Referring to FIGS. 1 and 4, while the image sensor 100 performs the first preparation operation PO1, the image sensor 100 may update at least some of settings of the first storage element SE1, the second storage element SE2, and the third storage element SE3. When the image sensor 100 starts the first preparation operation PO1, even though the setting information SI is received, the setting update of the setting information SI may be incapable of being applied to the image sensor 100.

When the first preparation operation PO1 is completed, the image sensor 100 may perform the image translation operation on the frame "F" including the first to m-th line data LD1 to LDm, based on the settings prepared by the first preparation operation PO1. While the image sensor 100 performs the image translation operation, even though the setting information SI is received, the setting update of the setting information SI may be incapable of being applied to the image translation operation of the frame "F".

Because the setting update of the setting information SI newly received when the first preparation operation PO1 starts is incapable of being applied to a next frame "F" (e.g., the frame "F" following the first preparation operation PO1), the first preparation operation PO1 may start within a vertical blank interval VBLANK as late as possible. For example, the image sensor 100 may determine the timing to start the first preparation operation PO1 such that the start of frame SOF is made after (e.g., immediately after) the first preparation operation PO1 is completed.

When the first preparation operation PO1 is performed during a second time interval TI2 of the vertical blank interval VBLANK, the setting update of the setting information SI received during a first time interval TI1 of the vertical blank interval VBLANK preceding the second time interval TI2 may be applied to the first preparation operation PO1 of the vertical blank interval VBLANK. That is, the time window in which the image sensor 100 is capable of immediately coping with the setting information SI of the external host device (e.g., capable of updating settings of the image sensor 100 within the vertical blank interval VBLANK where the setting information SI is received) may be the first time interval TI1. As the complete timing of the first preparation operation PO1 is aligned with the start of frame SOF, the image sensor 100 may cope with the setting change of the external host device (e.g., the input of the setting information SI) more quickly. As a result, the functionality of the image sensor 100 may be improved, based on the image sensor 100 adjusting settings (e.g., updating settings of the image sensor 100) more quickly, thereby configuring the image sensor 100 to output second image data generated according to the received setting information more quickly, based on adjusting the timing to start the next first preparation operation PO1 in response to receiving the setting information SI from an external host device.

In some example embodiments, a time necessary for performing the preparation operation may change depending on kinds and the number of settings to be updated during the preparation operation. In some example embodiments, an execution time of the preparation operation may be fixed. In some example embodiments where the execution time of the preparation operation is fixed, the execution time of the preparation operation may be set to the longest possible time (e.g., a worst case).

As described with reference to FIG. 2, the image sensor 100 according to some example embodiments of the present inventive concepts may identify kinds and the number of settings to be updated, based on the setting information SI and may identify a time necessary for updating settings based on the preparation time table 137. The image sensor 100 may dynamically adjust the preparation time based on a time necessary for updating settings.

Figure 5:
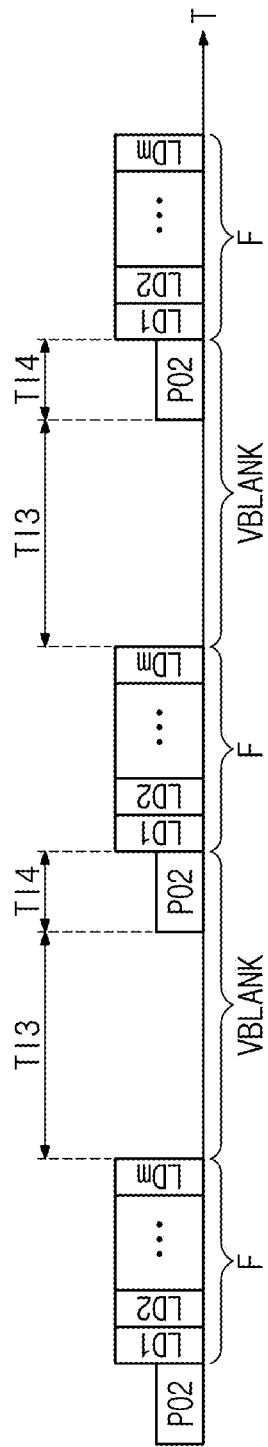
FIG. 5 illustrates a second example of a time window in which an image sensor is capable of coping with setting information of an external host device while the image sensor performs a second preparation operation according to some example embodiments of the present inventive concepts.

FIG. 5 illustrates a second example of a time window in which the image sensor 100 is capable of coping with the setting information SI of the external host device while the image sensor 100 performs a second preparation operation PO2 according to some example embodiments of the present inventive concepts. In FIG. 5, a horizontal axis represents a time "T". An operation of the image sensor 100 over time is illustrated in FIG. 5.

As described with reference to FIG. 4, a timing to end the second preparation operation PO2 may be aligned with the start of frame SOF. As the image sensor 100 adaptively adjusts the preparation time, the second preparation operation PO2 may be performed during a fourth time interval TI4. The fourth time interval TI4 may be shorter than the second time interval TI2 of FIG. 4.

In the vertical blank interval VBLANK, the time window in which the image sensor 100 is capable of immediately coping with the setting information SI of the external host device (e.g., capable of updating settings of the image sensor 100 within the vertical blank interval VBLANK where the setting information SI is received) may be a third time interval TI3. The third time interval TI3 may be longer than the first time interval TI1 of FIG. 4.

As the preparation time is dynamically adjusted based on a result of identifying a time necessary for updating settings, when the time necessary for update is relatively short, the time window capable of coping with the setting information SI is relatively long. As the preparation time is dynamically adjusted based on a result of identifying a time necessary for updating settings, even when the time necessary for update is relatively long, the time window longer than the time window of at least the worst case may be secured. Accordingly, the image sensor 100 may reduce the time necessary for changing settings by immediately applying more settings through a longer time window. As a result, the functionality of the image sensor 100 may be improved, based on the image sensor 100 being configured to change (e.g., adjust, update, etc.) settings of the image sensor 100 more quickly based on adjusting the timing to start a next preparation operation in response to receiving the setting information from an external host device. For example, the image sensor 100 may be configured to adjust translation of the first image data ID1 to the second image data ID2 according to the setting information, and thus the image sensor 100 may be configured to output second image data generated according to the received setting information more quickly, based on adjusting the timing to start a next preparation operation in response to receiving the setting information from an external host device. For example, the image sensor 100 may be configured to more quickly adapt and/or respond to requests to adjust (e.g., update) translations of the first image data ID1 to the second image data ID2, based on adjusting the timing to start a next preparation operation in response to receiving the setting information from an external host device.

In some example embodiments, when the setting information SI is not received, that is, when the settings of the image sensor 100 are not changed, the image sensor 100 may perform the default preparation operation during the default preparation time. For example, the default preparation operation may include an operation of checking whether to change the setting information SI, an operation of counting a frame count, an operation of generating a random number, an operation of generating a random noise based on the random number, and an operation of calculating a setting for applying the random noise to the first image data ID1 so as to be set to the image signal processor 132. When the image sensor 100 performs the default preparation operation, the time window capable of immediately applying the setting information SI may be the greatest.

Figure 6:
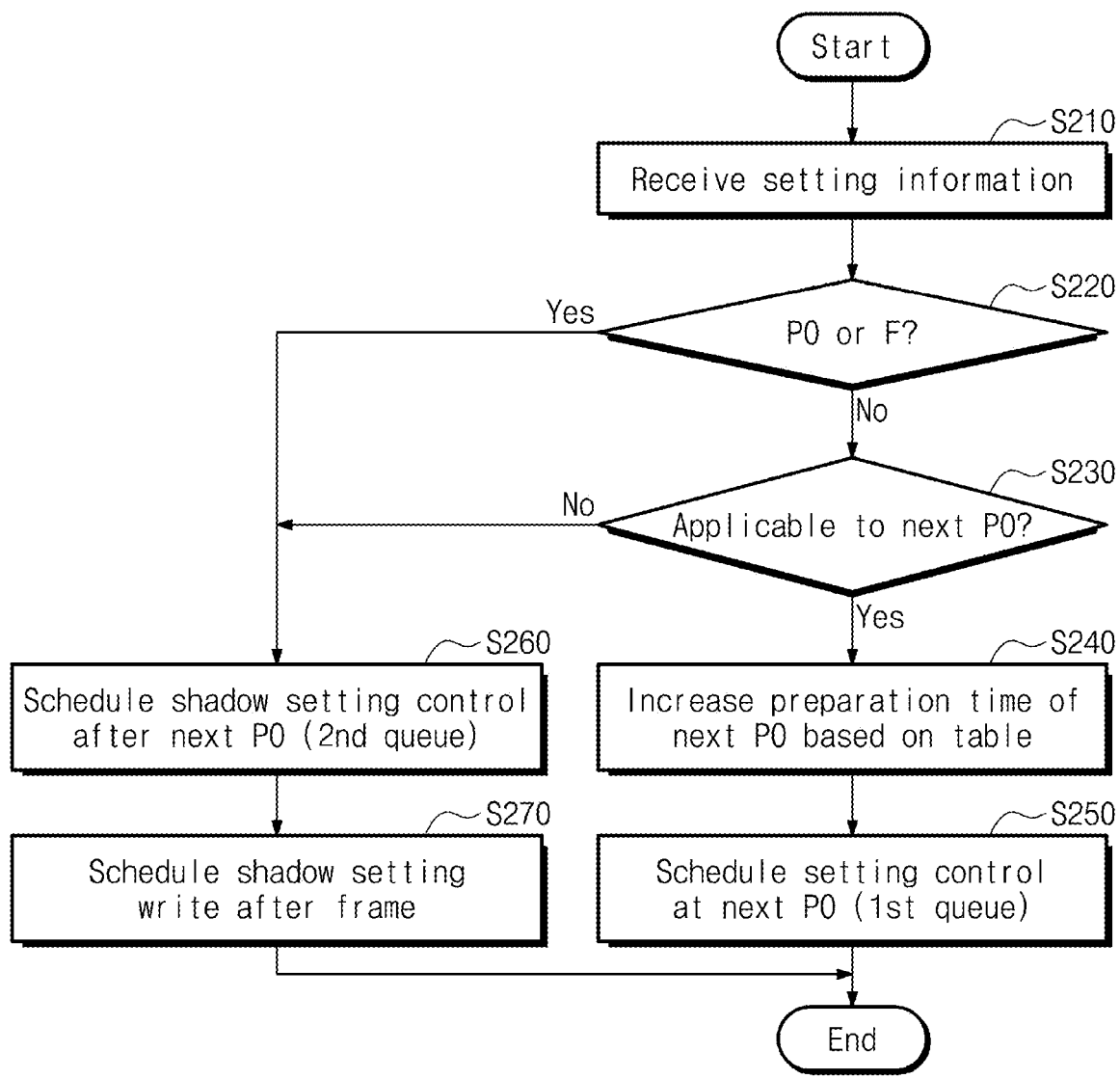
FIG. 6 illustrates an example in which an image sensor determines a timing to update settings based on setting information according to some example embodiments of the present inventive concepts.

FIG. 6 illustrates an example in which the image sensor 100 determines a timing to update settings based on the setting information SI according to some example embodiments of the present inventive concepts. Referring to FIGS. 1 and 6, in operation S210, the image sensor 100 may receive the setting information SI. For example, the host interface 139 of the image data translation circuit 130 in the image sensor 100 may receive the setting information SI from the external host device. The host interface 139 may write the setting information SI in the host register 138. The main processor 135 may read the setting information SI from the host register 138.

In operation S220, the image sensor 100 may determine whether the timing of receiving the setting information SI corresponds to a timing of the preparation operation PO or the frame "F". For example, the main processor 135 of the image data translation circuit 130 of the image sensor 100 may determine whether the timing of receiving the setting information SI corresponds to the timing when the preparation operation PO is being performed or the timing when the image translation operation of the frame "F" is being performed. When the timing of receiving the setting information SI corresponds to the timing of the preparation operation PO or the frame "F", operation S260 may be performed. When the timing of receiving the setting information SI does not correspond to the timing of the preparation operation PO or the frame "F", operation S230 may be performed.

When the timing of receiving the setting information SI does not correspond to the timing of the preparation operation PO or the frame "F", in operation S230, the image sensor 100 may determine whether the update of settings is applicable to a next preparation operation PO. For example, the main processor 135 of the image data translation circuit 130 of the image sensor 100 may identify a kind (and the number, quantity, etc.) of a setting(s) to be updated by the setting information SI. The main processor 135 may identify a time necessary for updating the setting(s), based on the preparation time table 137.

When it is possible to adjust (e.g., increase) the execution time of the next preparation operation PO as much as a time necessary for updating the setting(s), the main processor 135 may determine that the setting(s) to be updated is applicable to the next preparation operation PO (S230=YES). For example, when it is possible to advance a timing to start the next preparation operation PO as much as a time necessary for updating the setting(s), the main processor 135 may determine that the setting(s) to be updated is applicable to the next preparation operation PO. When the update of the setting(s) is not applicable to the next preparation operation PO (S230=NO), operation S260 may be performed. When the update of the setting(s) is applicable to the next preparation operation PO (S230=YES), operation S240 may be performed.

When the timing of receiving the setting information SI does not correspond to the timing of the preparation operation PO or the frame "F" (No in operation S220) and the update of the setting(s) is applicable to the next preparation operation PO (Yes in operation S230), operation S240 may be performed. In operation S240, the image sensor 100 may increase the preparation time of next preparation operation PO based on the preparation time table 137. For example, the image sensor 100 may advance the timing to start the next preparation operation PO. For example, the main processor 135 of the image data translation circuit 130 of the image sensor 100 may advance the timing to start the next preparation operation PO as much as the time necessary for updating the setting(s). That is, the degree (e.g., magnitude) to which the timing to start the next preparation operation PO is advanced may be determined based on the setting information SI and the preparation time table 137.

Afterwards, in operation S250, the main processor 135 may schedule a setting control in the next preparation operation PO. The setting control may include an operation of calculating a setting(s) to be written in the first storage element SE1, the second storage element SE2, or the third storage element SE3 from the setting information SI (referred to as a "setting calculation operation") and an operation of writing the calculated setting(s) in the first storage element SE1, the second storage element SE2, or the third storage element SE3 (referred to as a "setting write operation").

A setting write command for the setting write operation may be managed in a first queue of the main processor 135. The first queue may store setting write commands for one or more settings. The setting write command may be, for example, in the form of "Write (ADDR, DATA)". Herein, "Write" may mean a write command, "ADDR" may represent an address for identifying a target for the setting write operation, and "DATA" may represent data to be written at an address indicated by "ADDR", for example, an update setting. In the next preparation operation PO, the main processor 135 may execute the setting write command(s) of the first queue and may write the update setting DATA in a storage space of the first storage element SE1, the second storage element SE2, or the third storage element SE3, which is indicated by the address ADDR.

When the setting information SI is received at the timing of the preparation operation PO or the frame "F" (Yes in operation S220) or when the setting information SI is not received at the timing of the preparation operation PO or the frame "F" (No in operation S220) and the update of the setting(s) is not applicable to the next preparation operation PO (No in operation S230), operation S260 may be performed. In operation S260, the image sensor 100 may schedule a shadow setting control after the next preparation operation PO. For example, the main processor 135 of the image data translation circuit 130 of the image sensor 100 may maintain the execution time of the next preparation operation PO (or the timing to start the next preparation operation PO) without adjusting (e.g., advancing) the timing.

The shadow setting control may include an operation of calculating a setting(s) to be written in the first storage element SE1, the second storage element SE2, or the third storage element SE3 from the setting information SI (referred to as a "setting calculation operation") and an operation of writing the calculated setting(s) in the shadow register 134 (referred to as a "shadow setting write operation").

A shadow setting write command for the shadow setting write operation may be managed in a second queue of the main processor 135. The second queue may store shadow setting write commands for one or more settings. The shadow setting write command may be, for example, in the form of "Write (SR, ADDR, DATA)". Herein, "Write" may mean a write command, "SR" may represent that a write target is the shadow register 134, "ADDR" may represent an address for identifying a target for the setting write operation, and "DATA" may represent data to be written at an address indicated by "ADDR", for example, an update setting. After the preparation operation PO (e.g., after the next preparation operation PO when the setting information SI is received at a timing being not the timing of the preparation operation PO or after the preparation operation PO being currently performed when the setting information SI is received at the timing of the preparation operation PO), the main processor 135 may execute the shadow setting write command(s) of the second queue and may write the address ADDR and the update setting DATA in the shadow register 134.

Afterwards, in operation S270, the main processor 135 may schedule the shadow setting write operation after the frame timing. The shadow setting write operation may include an operation in which the DMA of the shadow register 134 writes the update setting DATA in a storage space of the first storage element SE1, the second storage element SE2, or the third storage element SE3, which is indicated by the address ADDR, based on the address ADDR and the update setting DATA written in the shadow register 134.

In some example embodiments, after performing the shadow setting control, the main processor 135 may mark a first flag bit with regard to the DMA. Based on the marking of the first flag bit, the DMA may identify that there is a need to perform the shadow setting write operation. After the frame timing, the DMA may write the update setting DATA stored in the shadow register 134 in the storage space indicated by the address ADDR and may release the first flag bit. In some example embodiments, the DMA may perform the shadow setting write operation in response to a signal transferred from the main processor 135.

In some example embodiments, as described with reference to operation S220, the setting information SI that is received in an interval of the preparation operation PO or the frame "F" may be applied to the image sensor 100 through the shadow setting control (S260) and the shadow setting write operation (S270).

As described with reference to operation S230, setting information applicable to the next preparation operation PO from among the setting information SI received in an interval being not the interval of the preparation operation PO or the frame "F" (e.g., a portion of the setting information SI) may be applied to the image sensor 100 through the setting control (S250). The setting information incapable of being applicable to the next preparation operation PO from among the setting information SI received in an interval being not the interval of the preparation operation PO or the frame "F" (e.g., the remaining portion of the setting information SI) may be applied to the image sensor 100 through the shadow setting control (S260) and the shadow setting write operation (S270).

In some example embodiments, through the image translation elements including the image signal processor 132 and the output interface 133, the first to m-th line data LD1 to LDm of the frame "F" may be sequentially translated based on the settings. Some of settings to be updated by the setting information SI may have continuity in the image translation elements. For example, when a first setting among the settings to be updated is updated, a second setting that is applied following the first setting should be updated to normally perform the image translation operation; in this case, it may be determined that the first setting and the second setting have continuity. The main processor 135 may process settings having continuity like one setting. For example, in operation S230, the main processor 135 may determine whether all settings having continuity are applicable to the next preparation operation PO.

Figure 7:
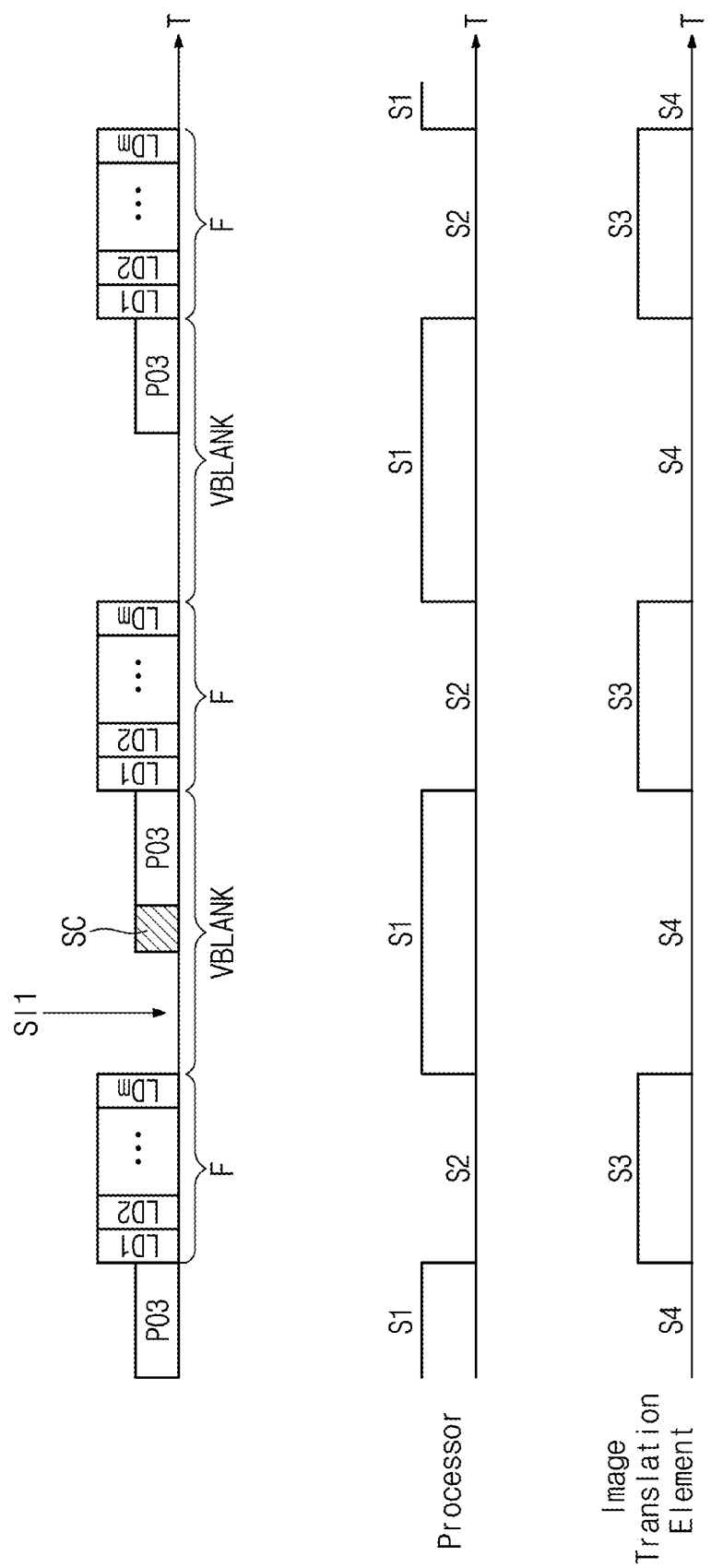
FIG. 7 illustrates an example in which an image sensor processes first setting information according to some example embodiments of the present inventive concepts.

FIG. 7 illustrates an example in which the image sensor 100 processes first setting information SI1 according to some example embodiments of the present inventive concepts. In FIG. 7, a horizontal axis represents a time "T". An operation of the image sensor 100, a state of the main processor 135, and a state of the image translation elements (e.g., including the image signal processor 132 and the output interface 133) over time are illustrated in FIG. 7.

Referring to FIGS. 1, 6, and 7, the first setting information SI1 may be received within a time window capable of processing the first setting information SI1, which is not the timing of a third preparation operation PO3 or the frame "F" (No in operation S220). In some example embodiments, settings to be updated by the first setting information SI1 may be applicable to a next third preparation operation PO3 (Yes in operation S230).

The main processor 135 may identify a time necessary for updating the settings based on the first setting information SI1, with reference to the preparation time table 137. The main processor 135 may increase the execution time of the third preparation operation PO3 as much as the identified time. For example, the main processor 135 may advance the timing to start the third preparation operation PO3 as much as the identified time. The time interval increased or advanced by the main processor 135 is shown by a box filled with oblique lines.

In the time interval of the third preparation operation PO3 increased by the main processor 135, the main processor 135 may perform a setting control SC. As the setting control SC is performed in the next third preparation operation PO3, the first setting information SI1 may be immediately applied to the next frame "F".

In some example embodiments, in the vertical blank interval VBLANK, the image translation elements may be in a fourth state S4 being a standby state. In the interval of the frame "F", the image translation elements may be in a third state S3 being an active state. In the vertical blank interval VBLANK, the main processor 135 may be in a first state S1 being an active state. In the interval of the frame "F", the main processor 135 may be in a second state S2 being a standby state.

Figure 8:
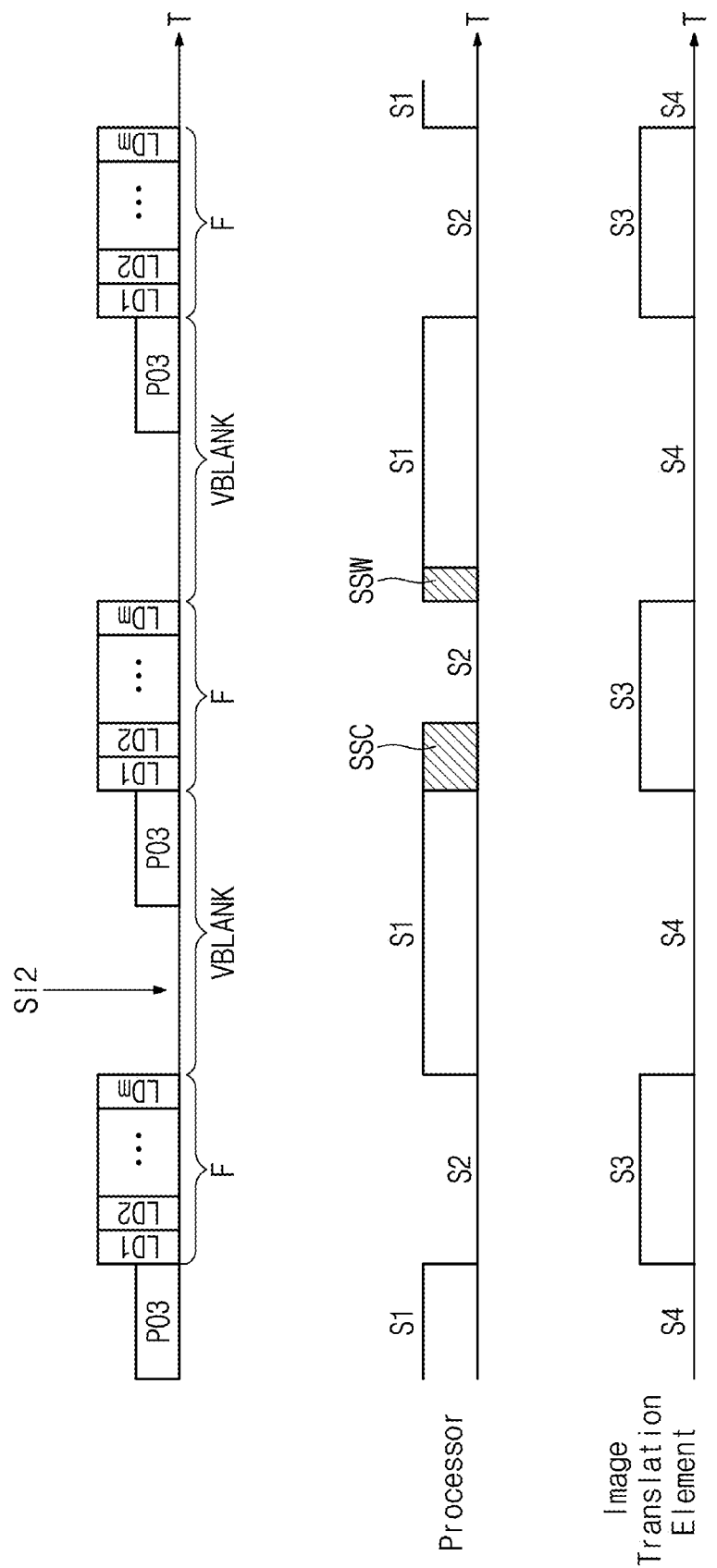
FIG. 8 illustrates an example in which an image sensor processes second setting information according to some example embodiments of the present inventive concepts.

FIG. 8 illustrates an example in which the image sensor 100 processes second setting information SI2 according to some example embodiments of the present inventive concepts. In FIG. 8, a horizontal axis represents a time "T". An operation of the image sensor 100, a state of the main processor 135, and a state of the image translation elements (e.g., including the image signal processor 132 and the output interface 133) over time are illustrated in FIG. 8.

Referring to FIGS. 1, 6, and 8, the second setting information SI2 may be received within a time window capable of processing the second setting information SI2, which is not the timing of the third preparation operation PO3 or the frame "F" (No in operation S220). In some example embodiments, settings to be updated by the second setting information SI2 may be incapable of being applied to a next third preparation operation PO3 (No in operation S230). For example, a time necessary for updating the settings may be greater than a time difference between the time of receiving the second setting information SI2 and the timing to start the third preparation operation PO3.

The main processor 135 may maintain the timing to start the next third preparation operation PO3. After the next third preparation operation PO3 is completed, for example, at the timing of the frame "F", the main processor 135 may perform a shadow setting control SSC (S260). For example, the main processor 135 may perform the shadow setting control SSC after the start of frame SOF.

After the timing of the frame "F", for example, before the third preparation operation PO3 starts in the next vertical blank interval VBLANK, the main processor 135 may perform a shadow setting write operation SSW (S270). For example, the main processor 135 may perform the shadow setting write operation SSW after an end of frame EOF. When the shadow setting write operation SSW is performed, the settings according to the second setting information SI2 received in the previous vertical blank interval VBLANK may be applied to the image sensor 100, that is, may be updated in the image sensor 100.

In some example embodiments, in the vertical blank interval VBLANK, the image translation elements may be in the fourth state S4 being a standby state. In the interval of the frame "F", the image translation elements may be in the third state S3 being an active state. In the vertical blank interval VBLANK, the main processor 135 may be in the first state S1 being an active state. In the interval of the frame "F", the main processor 135 may be in the first state S1 being an active state during performing the shadow setting control SSC and may be in the second state S2 being a standby state in the remaining interval.

Figure 9:
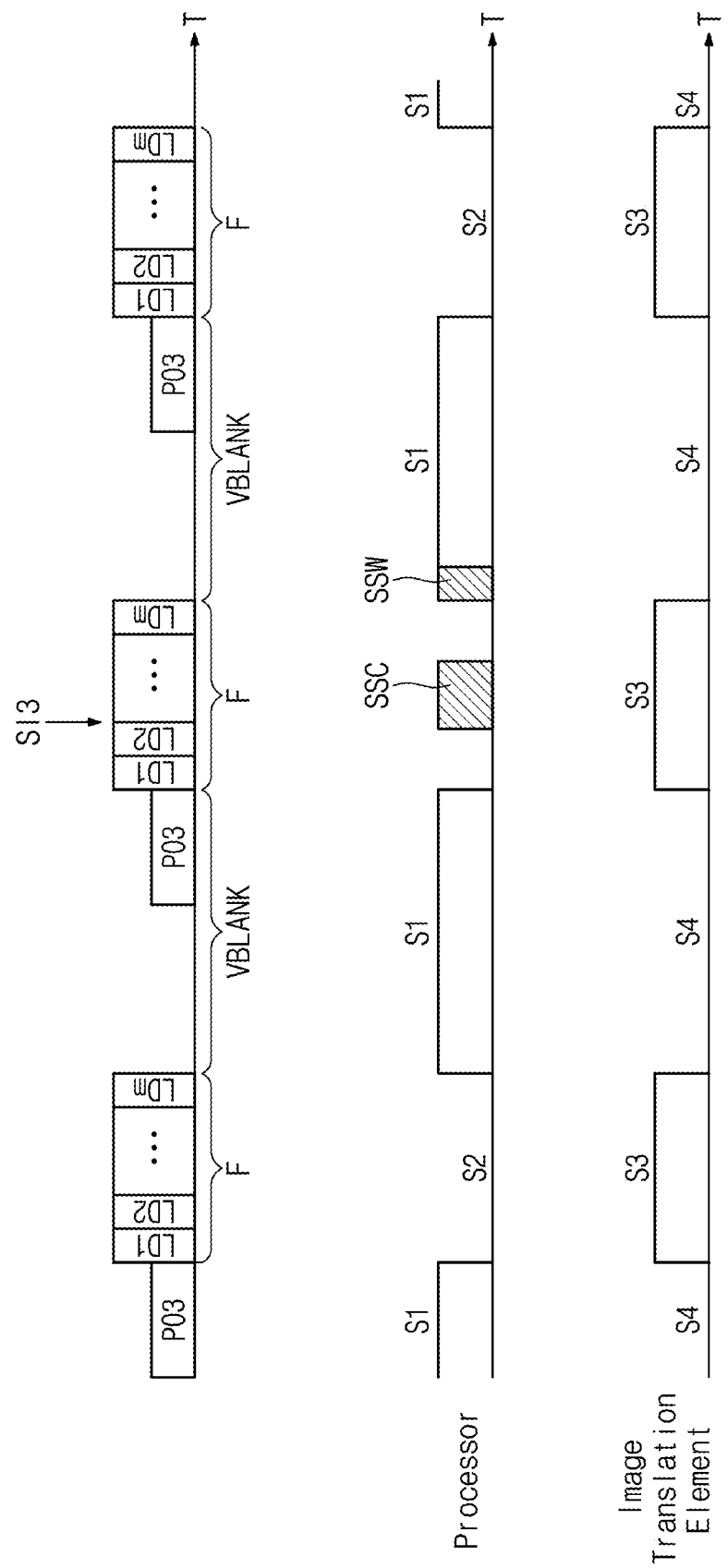
FIG. 9 illustrates an example in which an image sensor processes third setting information according to some example embodiments of the present inventive concepts.

FIG. 9 illustrates an example in which the image sensor 100 processes third setting information SI3 according to some example embodiments of the present inventive concepts. In FIG. 9, a horizontal axis represents a time "T". An operation of the image sensor 100, a state of the main processor 135, and a state of the image translation elements (e.g., including the image signal processor 132 and the output interface 133) over time are illustrated in FIG. 9.

Referring to FIGS. 1, 6, and 9, the third setting information SI3 may be received at the timing of the frame "F" (Yes in operation S220).

The main processor 135 may maintain the timing to start the next third preparation operation PO3. Before the next third preparation operation PO3 is performed, for example, at the timing of the frame "F", the main processor 135 may perform the shadow setting control SSC (S260). For example, the main processor 135 may perform the shadow setting control SSC when the setting information SI is received.

After the timing of the frame "F", for example, before the third preparation operation PO3 starts in the next vertical blank interval VBLANK, the main processor 135 may perform the shadow setting write operation SSW (S270). For example, the main processor 135 may perform the shadow setting write operation SSW after the end of frame EOF. When the shadow setting write operation SSW is performed, the settings updated according to the third setting information SI3 received at the timing of the frame "F" may be applied to the image sensor 100.

In some example embodiments, in the vertical blank interval VBLANK, the image translation elements may be in the fourth state S4 being a standby state. In the interval of the frame "F", the image translation elements may be in the third state S3 being an active state. In the vertical blank interval VBLANK, the main processor 135 may be in the first state S1 being an active state. In the interval of the frame "F", the main processor 135 may be in the first state S1 being an active state during performing the shadow setting control SSC and may be in the second state S2 being a standby state in the remaining interval.

In some example embodiments, when the second setting information SI2 is received in the interval of the third preparation operation PO3, as described with reference to FIG. 9, the main processor 135 may maintain the timing to start the next third preparation operation PO3. Also, as described with reference to FIG. 8, the main processor 135 may perform the shadow setting control SSC after the start of frame SOF and may perform the shadow setting write operation SSW after the end of frame EOF.

Figure 10:
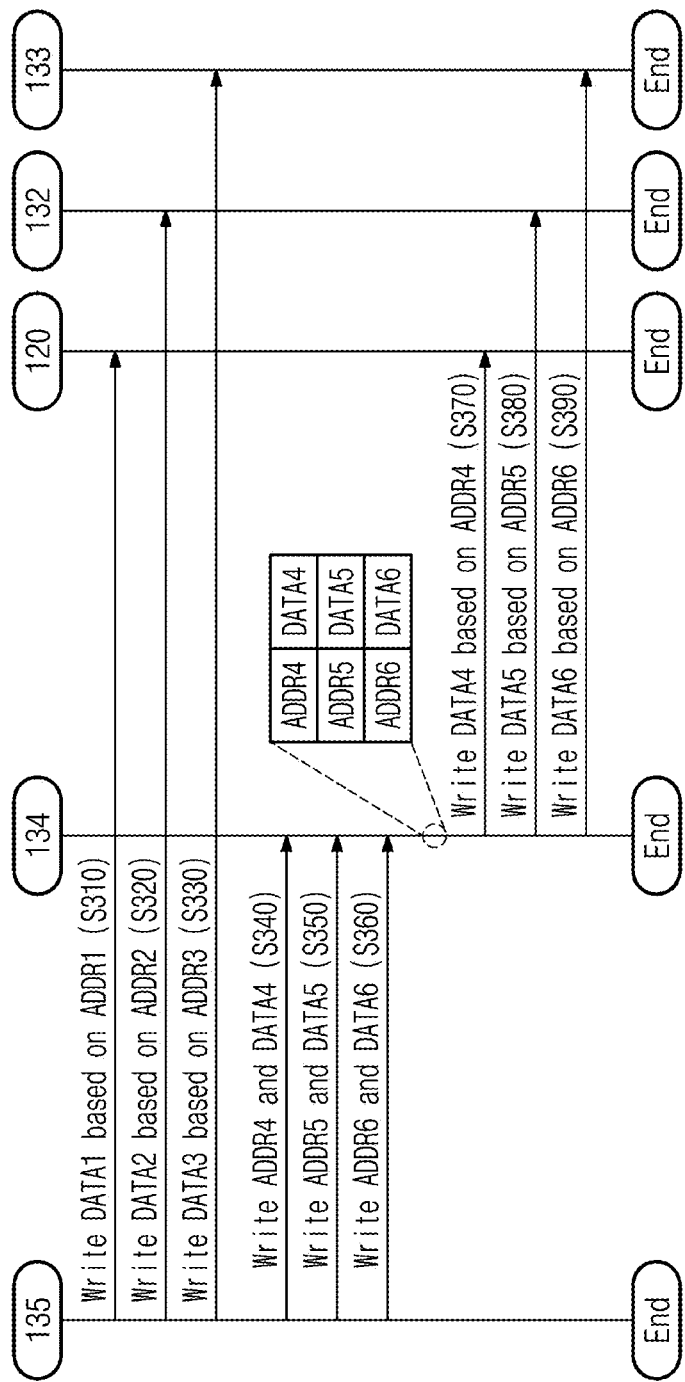
FIG. 10 illustrates an example in which an image sensor performs a setting control and a shadow setting control according to some example embodiments of the present inventive concepts.

FIG. 10 illustrates an example in which the image sensor 100 performs the setting control SC and the shadow setting control SSC according to some example embodiments of the present inventive concepts. Referring to FIGS. 1 and 10, the image sensor 100 may operate in response to a determination that the setting information SI is received. For example, the setting information SI may request to write first update setting DATA1 in a storage space corresponding to a first address ADDR1 from among storage spaces of the first storage element SE1, the second storage element SE2, and the third storage element SE3. The main processor 135 of the image data translation circuit 130 of the image sensor 100 may determine that the first update setting DATA1 is capable of being written through the setting control SC (refer to FIG. 6). In operation S310, the main processor 135 may write the first update setting DATA1 based on the first address ADDR1. For example, the main processor 135 may write the first update setting DATA1 in the storage space of the first storage element SE1.

The setting information SI may request to write second update setting DATA2 in a storage space corresponding to a second address ADDR2 from among the storage spaces of the first storage element SE1, the second storage element SE2, and the third storage element SE3. The image sensor 100 may determine that the second update setting DATA2 is capable of being written through the setting control SC (refer to FIG. 6). In operation S320, the main processor 135 may write the second update setting DATA2 based on the second address ADDR2. For example, the main processor 135 may write the second update setting DATA2 in the storage space of the second storage element SE2.

The setting information SI may request to write third update setting DATA3 in a storage space corresponding to a third address ADDR3 from among the storage spaces of the first storage element SE1, the second storage element SE2, and the third storage element SE3. The main processor 135 may determine that the third update setting DATA3 is capable of being written through the setting control SC (refer to FIG. 6). In operation S330, the main processor 135 may write the third update setting DATA3 based on the third address ADDR3. For example, the image sensor 100 may write the third update setting DATA3 in the storage space of the third storage element SE3.

The setting information SI may request to write fourth update setting DATA4 in a storage space corresponding to a fourth address ADDR4 from among the storage spaces of the first storage element SE1, the second storage element SE2, and the third storage element SE3. The main processor 135 may determine that the fourth update setting DATA4 is incapable of being written through the setting control SC (refer to FIG. 6). In operation S340, the main processor 135 may perform the shadow setting control SSC to write the fourth address ADDR4 and the fourth update setting DATA4 in the shadow register 134.

The setting information SI may request to write fifth update setting DATA5 in a storage space corresponding to a fifth address ADDR5 from among the storage spaces of the first storage element SE1, the second storage element SE2, and the third storage element SE3. The main processor 135 may determine that the fifth update setting DATA5 is incapable of being written through the setting control SC (refer to FIG. 6). In operation S350, the main processor 135 may perform the shadow setting control SSC to write the fifth address ADDR5 and the fifth update setting DATA5 in the shadow register 134.

The setting information SI may request to write sixth update setting DATA6 in a storage space corresponding to a sixth address ADDR6 from among the storage spaces of the first storage element SE1, the second storage element SE2, and the third storage element SE3. The main processor 135 may determine that the sixth update setting DATA6 is incapable of being written through the setting control SC (refer to FIG. 6). In operation S360, the main processor 135 may perform the shadow setting control SSC to write the sixth address ADDR6 and the sixth update setting DATA6 in the shadow register 134.

At the end of frame EOF, the DMA may write the information written in the shadow register 134 in the first storage element SE1, the second storage element SE2, or the third storage element SE3.

For example, in operation S370, the DMA may write the fourth update setting DATA4 stored in the shadow register 134 in the storage space of the first storage element SE1, based on the fourth address ADDR4 stored in the shadow register 134. In operation S380, the DMA may write the fifth update setting DATA5 stored in the shadow register 134 in the storage space of the second storage element SE2, based on the fifth address ADDR5 stored in the shadow register 134. In operation S390, the DMA may write the sixth update setting DATA6 stored in the shadow register 134 in the storage space of the third storage element SE3, based on the sixth address ADDR6 stored in the shadow register 134.

In some example embodiments, the first to sixth addresses ADDR1 to ADDR6 and the first to sixth update settings DATA1 to DATA6 may come from one setting information SI. That is, in response to one setting information SI, settings of the image sensor 100 may be updated by the setting control SC or by the shadow setting control SSC and the shadow setting write operation SSW. As another example, the first to sixth addresses ADDR1 to ADDR6 and the first to sixth update settings DATA1 to DATA6 may come from two or more setting information SI.

Figure 11:
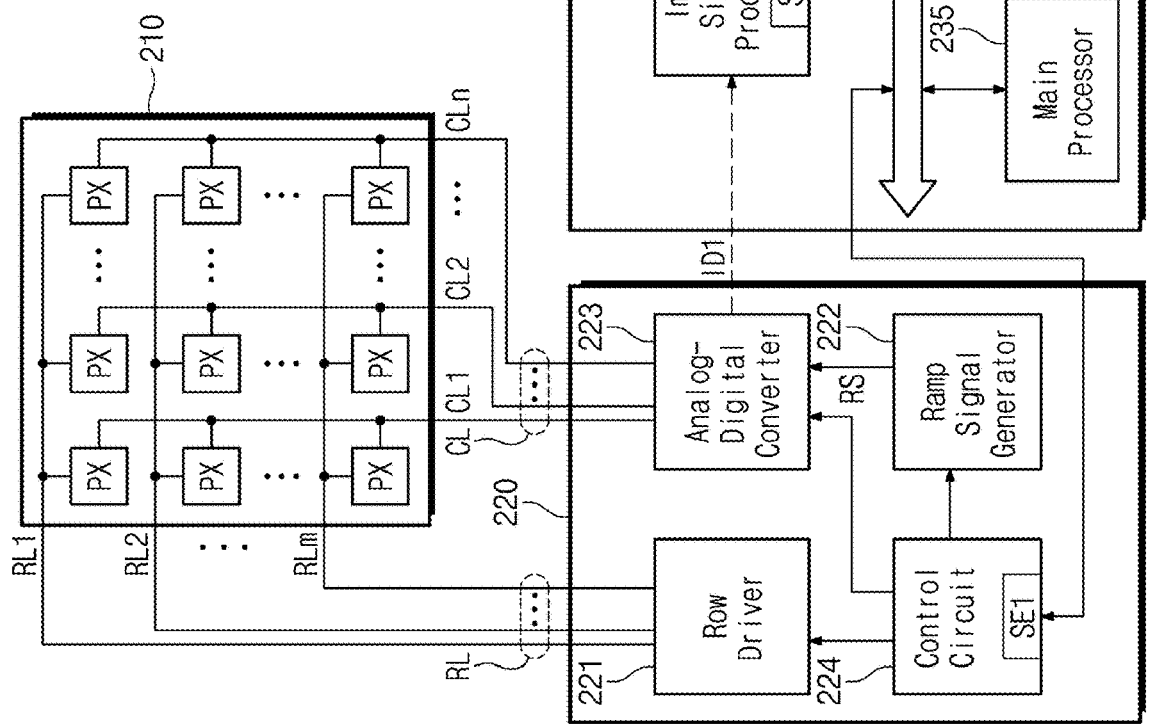
FIG. 11 illustrates an image sensor according to some example embodiments of the present inventive concepts.

FIG. 11 illustrates an image sensor 200 according to some example embodiments of the present inventive concepts. Referring to FIG. 11, the image sensor 200 may include a pixel array 210, an image data generation circuit 220, and an image data translation circuit 230.

The pixel array 210 may include the plurality of pixels PX arranged in rows and columns in the form of a matrix. The rows of the pixels PX may be connected to the row lines RL including the first to m-th row lines RL1 to RLm. The columns of the pixels PX may be connected to the column lines CL including the first to n-th column lines CL1 to CLn. A configuration and an operation of the pixel array 210 may be the same as those of the pixel array 110 described with reference to FIG. 1. Accordingly, the description given with reference to the pixel array 110 of FIG. 1 may be equally applied to the pixel array 210 of FIG. 11.

The image data generation circuit 220 may perform a first image translation operation in which signals of the pixels PX are translated into the first image data ID1. The image data generation circuit 220 may include a row driver 221, a ramp signal generator 222, an analog-to-digital converter 223, and a control circuit 224. A configuration and an operation of the image data generation circuit 220 may be the same as those of the image data generation circuit 120 described with reference to FIG. 1. Accordingly, the description given with reference to the image data generation circuit 120 of FIG. 1 may be equally applied to the image data generation circuit 220 of FIG. 11.

The image data translation circuit 230 may include a bus 231, an image signal processor 232, an output interface 233, a shadow register 234, a main processor 235, a random access memory 236, a preparation time table 237, a host register 238, and a host interface 239. The bus 231 may provide channels between the components of the image data translation circuit 230.

Configurations and operations of the bus 231, the image signal processor 232, the output interface 233, the random access memory 236, the preparation time table 237, the host register 238, and the host interface 239 may be the same as those of the bus 131, the image signal processor 132, the output interface 133, the random access memory 136, the preparation time table 137, the host register 138, and the host interface 139 described with reference to FIG. 1. Accordingly, the description given with reference to the bus 131, the image signal processor 132, the output interface 133, the random access memory 136, the preparation time table 137, the host register 138, and the host interface 139 of FIG. 1 may be equally applied to the bus 231, the image signal processor 232, the output interface 233, the random access memory 236, the preparation time table 237, the host register 238, and the host interface 239 of FIG. 11.

In some example embodiments, the main processor 235 may not perform the operations described with reference to FIG. 6. When the setting information SI is received from the external host device, the main processor 235 may provide an updater 240 with the setting write command(s) corresponding to the setting information SI. The setting write command may be, for example, in the form of "Write (UP, ADDR, DATA)". Herein, "Write" may mean a write command, "UP" may represent the updater 240, "ADDR" may represent an address for identifying a target for the setting write operation, and "DATA" may represent data to be written at an address indicated by "ADDR", for example, an update setting.

The updater 240 may perform the operations described with reference to FIG. 6. For example, the updater 240 may determine that a timing of receiving the setting write command from the main processor 235 corresponds to the timing of the preparation operation PO or the frame "F" (S220). Also, when the timing of receiving the setting write command does not correspond to the timing of the preparation operation PO or the frame "F" (No in operation S220), the updater 240 may determine whether the received setting write command is applicable to the next preparation operation PO (S230). Depending on a determination result, as described with reference to FIGS. 6 to 10, the updater 240 may perform the setting control SC (S240 and S250) or the shadow setting control SSC (S260).

In the case of performing the shadow setting control SSC, following the end of frame EOF, the updater 240 may perform the shadow setting write operation SSW based on the information stored in the shadow register 234 (S270).

Figure 12:
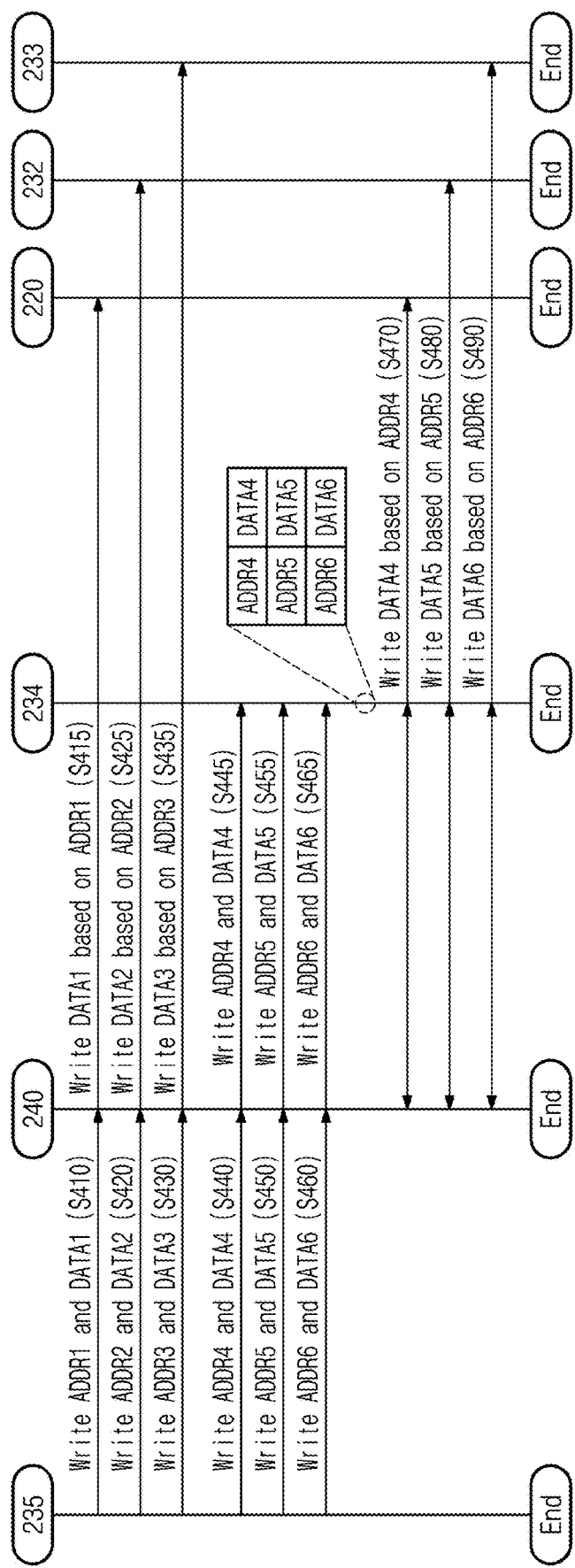
FIG. 12 illustrates another example in which an image sensor performs a setting control and a shadow setting control according to some example embodiments of the present inventive concepts.

FIG. 12 illustrates another example in which the image sensor 200 performs the setting control SC and the shadow setting control SSC according to some example embodiments of the present inventive concepts. Referring to FIGS. 11 and 12, the image sensor 200 may operate in response to a determination that the setting information SI is received. For example, the setting information SI may request to write the first update setting DATA1 in a storage space corresponding to the first address ADDR1 from among the storage spaces of the first storage element SE1, the second storage element SE2, and the third storage element SE3. In operation S410, the image sensor 200 may write the first address ADDR1 and the first update setting DATA1 in the updater 240. For example, the main processor 235 of the image data translation circuit 230 of the image sensor 200 may transfer the setting write command including the first address ADDR1 and the first update setting DATA1 to the updater 240. The updater 240 may determine that the first update setting DATA1 is capable of being written through the setting control SC (refer to FIG. 6). In operation S415, the updater 240 may write the first update setting DATA1 based on the first address ADDR1. For example, the updater 240 may write the first update setting DATA1 in the storage space of the first storage element SE1.

The setting information SI may request to write the second update setting DATA2 in a storage space corresponding to the second address ADDR2 from among the storage spaces of the first storage element SE1, the second storage element SE2, and the third storage element SE3. In operation S420, the main processor 235 may write the second address ADDR2 and the second update setting DATA2 in the updater 240. For example, the main processor 235 may transfer the setting write command including the second address ADDR2 and the second update setting DATA2 to the updater 240. The updater 240 may determine that the second update setting DATA2 is capable of being written through the setting control SC (refer to FIG. 6). In operation S425, the updater 240 may write the second update setting DATA2 based on the second address ADDR2. For example, the updater 240 may write the second update setting DATA2 in the storage space of the second storage element SE2.

The setting information SI may request to write the third update setting DATA3 in a storage space corresponding to the third address ADDR3 from among the storage spaces of the first storage element SE1, the second storage element SE2, and the third storage element SE3. In operation S430, the main processor 235 may write the third address ADDR3 and the third update setting DATA3 in the updater 240. For example, the main processor 235 may transfer the setting write command including the third address ADDR3 and the third update setting DATA3 to the updater 240. The updater 240 may determine that the third update setting DATA3 is capable of being written through the setting control SC (refer to FIG. 6). In operation S435, the updater 240 may write the third update setting DATA3 based on the third address ADDR3. For example, the updater 240 may write the third update setting DATA3 in the storage space of the third storage element SE3.

The setting information SI may request to write the fourth update setting DATA4 in a storage space corresponding to the fourth address ADDR4 from among the storage spaces of the first storage element SE1, the second storage element SE2, and the third storage element SE3. In operation S440, the main processor 235 may write the fourth address ADDR4 and the fourth update setting DATA4 in the updater 240. For example, the main processor 235 may transfer the setting write command including the fourth address ADDR4 and the fourth update setting DATA4 to the updater 240. The updater 240 may determine that the fourth update setting DATA4 is incapable of being written through the setting control SC (refer to FIG. 6). In operation S445, the updater 240 may perform the shadow setting control SSC to write the fourth address ADDR4 and the fourth update setting DATA4 in the shadow register 234.

The setting information SI may request to write the fifth update setting DATA5 in a storage space corresponding to the fifth address ADDR5 from among the storage spaces of the first storage element SE1, the second storage element SE2, and the third storage element SE3. In operation S450, the main processor 235 may write the fifth address ADDR5 and the fifth update setting DATA5 in the updater 240. For example, the main processor 235 may transfer the setting write command including the fifth address ADDR5 and the fifth update setting DATA5 to the updater 240. The updater 240 may determine that the fifth update setting DATA5 is incapable of being written through the setting control SC (refer to FIG. 6). In operation S455, the updater 240 may perform the shadow setting control SSC to write the fifth address ADDR5 and the fifth update setting DATA5 in the shadow register 234.

The setting information SI may request to write the sixth update setting DATA6 in a storage space corresponding to the sixth address ADDR6 from among the storage spaces of the first storage element SE1, the second storage element SE2, and the third storage element SE3. In operation S460, the main processor 235 may write the sixth address ADDR6 and the sixth update setting DATA6 in the updater 240. For example, the main processor 235 may transfer the setting write command including the sixth address ADDR6 and the sixth update setting DATA6 to the updater 240. The updater 240 may determine that the sixth update setting DATA6 is incapable of being written through the setting control SC (refer to FIG. 6). In operation S465, the updater 240 may perform the shadow setting control SSC to write the sixth address ADDR6 and the sixth update setting DATA6 in the shadow register 234.

At the end of frame EOF, the updater 240 may write the information written in the shadow register 234 in the first storage element SE1, the second storage element SE2, or the third storage element SE3.

For example, in operation S470, the updater 240 may write the fourth update setting DATA4 stored in the shadow register 234 in the storage space of the first storage element SE1, based on the fourth address ADDR4 stored in the shadow register 234. In operation S480, the updater 240 may write the fifth update setting DATA5 stored in the shadow register 234 in the storage space of the second storage element SE2, based on the fifth address ADDR5 stored in the shadow register 234. In operation S490, the updater 240 may write the sixth update setting DATA6 stored in the shadow register 234 in the storage space of the third storage element SE3, based on the sixth address ADDR6 stored in the shadow register 234.

In some example embodiments, the first to sixth addresses ADDR1 to ADDR6 and the first to sixth update settings DATA1 to DATA6 may come from one setting information SI. That is, in response to one setting information SI, settings of the image sensor 200 may be updated by the setting control SC or by the shadow setting control SSC and the shadow setting write operation SSW. As another example, the first to sixth addresses ADDR1 to ADDR6 and the first to sixth update settings DATA1 to DATA6 may come from two or more setting information SI.

As described above, when the updater 240 is provided, the main processor 235 may not perform the operations described with reference to FIG. 6 and may write the setting write commands corresponding to the setting information SI in the updater 240. Accordingly, some example embodiments of the present inventive concepts may be applied to the image sensor 200 only by changing the format of the setting write command in logic of the main processor 235. That is, it is easier to implement some example embodiments of the present inventive concepts. As a result, the functionality (e.g., operational reliability of the output second image data ID2) of the image sensor 200 may be improved, based on the image sensor 200 being configured to quickly adjust settings of the image sensor 200 more easily, and thus more reliably.

Figure 13:
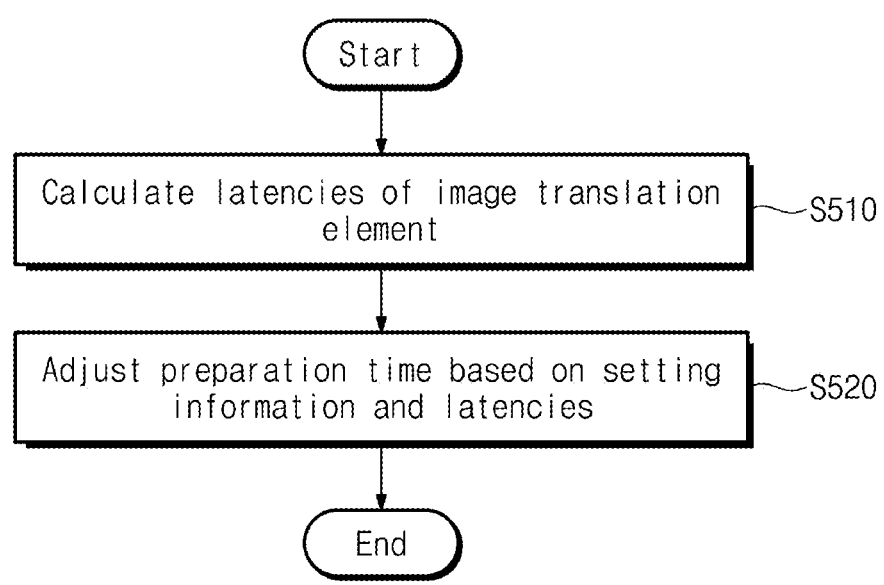
FIG. 13 illustrates an example of a method in which an image sensor operates in consideration of latencies of image translation elements according to some example embodiments of the present inventive concepts.

FIG. 13 illustrates an example of a method in which the image sensor 100 or 200 operates in consideration of latencies of image translation elements according to some example embodiments of the present inventive concepts. Referring to FIGS. 1, 11, and 13, in operation S510, the image sensor 100 or 200 may obtain latencies of image translation elements. For example, the image translation elements may include the image signal processor 132 or 232 and the output interface 133 or 233.

For example, the latencies of the image translation elements may be provided by using a look-up table like the preparation time table 137 or 237. The latencies of the image translation elements may be provided to the random access memory 136 or 236 or may be stored in a nonvolatile memory such as an electrically erasable and programmable read only memory (EEPROM), a one-time programmable (OTP) memory, or a flash memory. The main processor 135 or the updater 240 may obtain the latencies of the image translation elements from the table of the latencies.

In operation S520, the image sensor 100 or 200 may adjust the preparation time based on the setting information SI and the latencies. For example, the image sensor 100 or 200 may shift the execution time of the preparation time (e.g., a start timing and an end timing).

Figure 14:
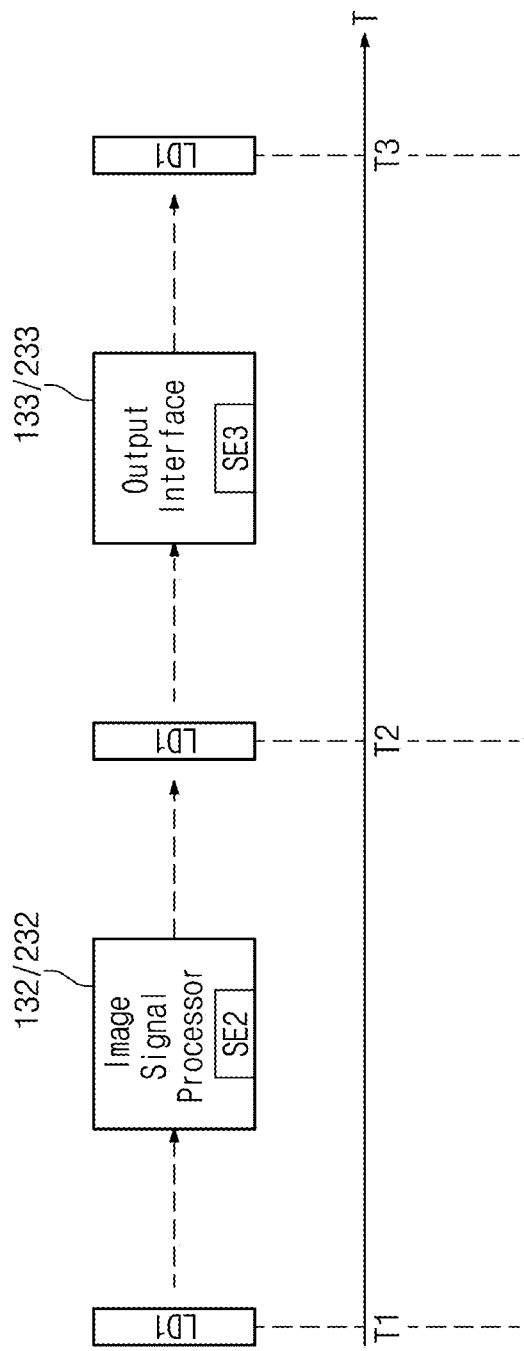
FIG. 14 illustrates an example in which first line data are sequentially translated through image translation elements according to some example embodiments of the present inventive concepts.

FIG. 14 illustrates an example in which the first line data LD1 are sequentially translated through image translation elements according to some example embodiments of the present inventive concepts. In FIG. 14, a horizontal axis represents a time "T". Operations of image translation elements over time are illustrated in FIG. 14.

Referring to FIGS. 1, 11, and 14, at a first time T1, the first line data LD1 may be transferred to the image signal processor 132 or 232. At a second time T2, the first line data LD1 may be transferred from the image signal processor 132 or 232 to the output interface 133 or 233. At a third time T3, the output interface 133 or 233 may output the first line data LD1.

The output interface 133 or 233 performs the image translation operation from the second time T2. Accordingly, when settings of the output interface 133 or 233 are written in the output interface 133 or 233 only until the second time T2, the image translation operation may be performed normally. The setting update of the output interface 133 or 233 may be performed when the second time T2 passes after the interval of the frame "F" starts.

Figure 15:
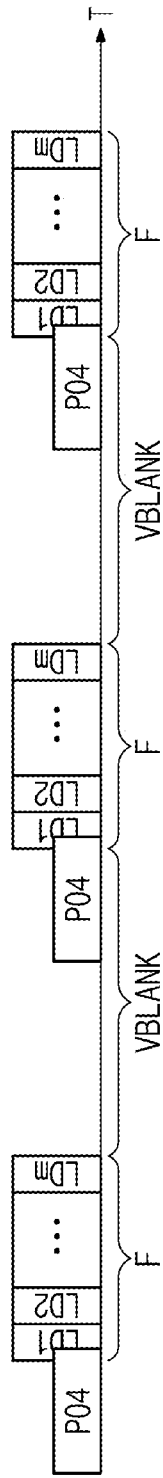
FIG. 15 illustrates an example in which an image sensor performs an image translation operation of a frame so as to overlap a fourth preparation operation according to some example embodiments of the present inventive concepts.

FIG. 15 illustrates an example in which the image sensor 100 or 200 performs the image translation operation of the frame "F" so as to overlap a fourth preparation operation PO4 according to some example embodiments of the present inventive concepts. Referring to FIGS. 1, 11, 14, and 15, the image sensor 100 or 200 may end the fourth preparation operation PO4 so as to be later than the start of frame SOF. As the timing of the fourth preparation operation PO4 ends to be later than the start of frame SOF, a time window capable of immediately processing the setting information SI may be further extended.

In some example embodiments, each of the image signal processor 132 or 232 and the output interface 133 or 233 may include a plurality of sequential stages performing a plurality of image translation operations. In the plurality of stages, a current stage may receive line data from a previous stage, may perform the image translation operation on the line data, and may transfer the line data to a next stage. The timing to change a setting of each of the plurality of stages may be delayed until line data reaches each of the plurality of stages. That is, based on latencies of the plurality of stages, a time window capable of immediately processing the setting information SI may be further extended by shifting the execution time (e.g., a start timing and an end timing) of the fourth preparation operation PO4.

Figure 16:
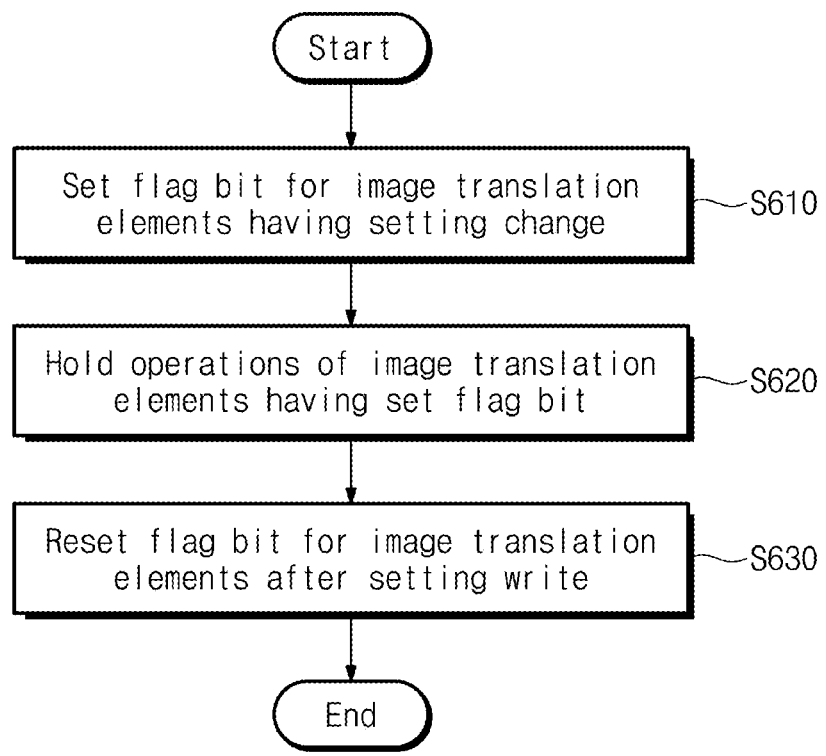
FIG. 16 illustrates an example of a method in which an image sensor controls a plurality of stages independently when shifting an execution time of a preparation operation according to some example embodiments of the present inventive concepts.

FIG. 16 illustrates an example of a method in which the image sensor 100 or 200 controls a plurality of stages independently when shifting an execution time of a preparation operation according to some example embodiments of the present inventive concepts. Referring to FIGS. 1, 11, 14, and 16, in operation S610, the image sensor 100 or 200 may set second flag bits for the image translation elements. For example, the main processor 135 or the updater 240 of the image data translation circuit 130 or 230 of the image sensor 100 or 200 may set the second flag bits for stages of the image translation elements corresponding to settings targeted for update. The second flag bits may indicate that settings will be updated.

In operation S620, the image sensor 100 or 200 may hold operations of the image translation elements having the second flag bits thus set. For example, stages having the set second flag bits from among a plurality of stages of the image translation elements may hold the image translation operation. For example, even though line data are received, a stage having the set second flag bit may wait without performing the image translation operation.

In operation S630, the image sensor 100 or 200 may reset (or release) the second flag bits of the image translation elements after the settings are written. For example, after updating a setting of a stage having the set second flag bit, the main processor 135 or the updater 240 may reset (or release) the second flag bit of the updated stage. The stage having the second flag bit thus reset (or released) may perform the image translation operation on the line data. For example, after the second flag bit is reset (or released), the stage may perform the image translation operation on the line data input thereto. In some example embodiments, after the second flag bit is reset (or released), the stage may perform the image translation operation on the held line data.

As described above, as the second flag bit is set to each of the plurality of stages, each stage may be prevented from performing the image translation operation based on a setting not updated.

Figure 17:
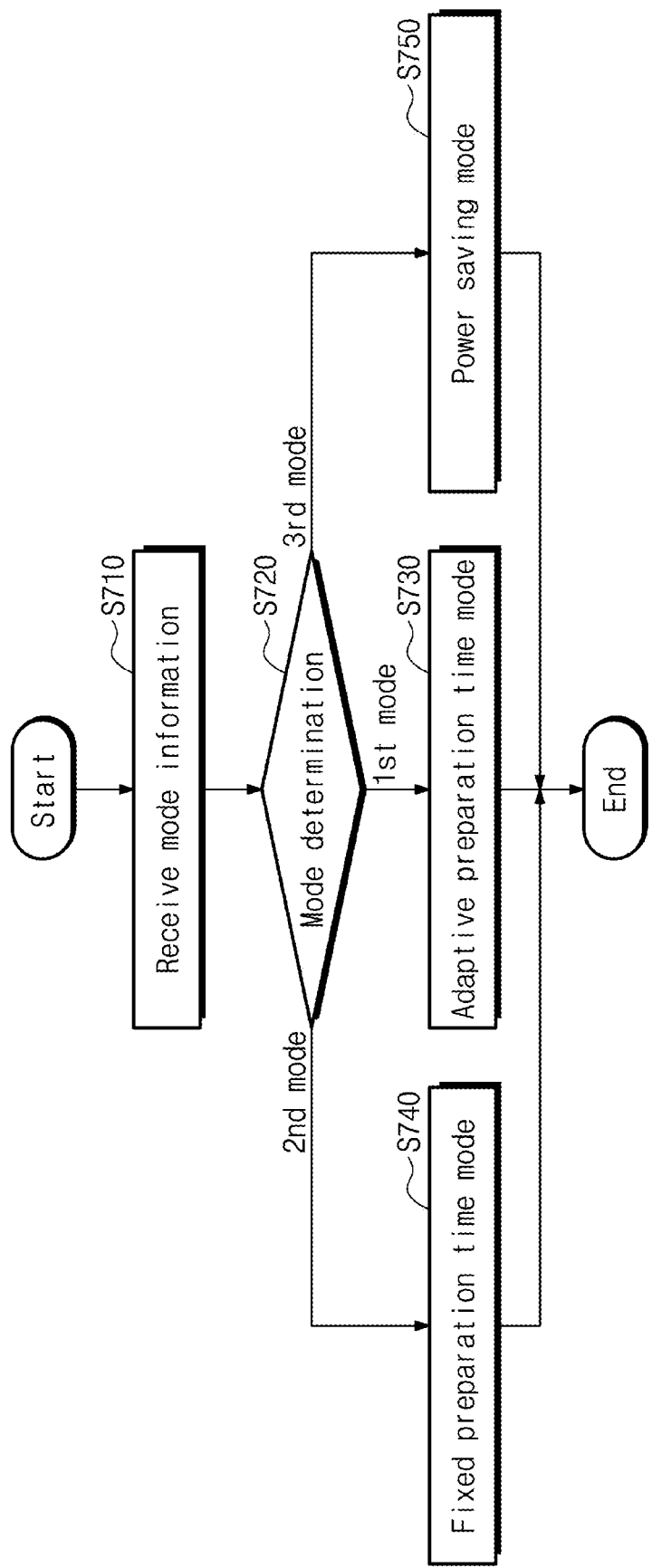
FIG. 17 illustrates an example of a method in which an image sensor operates in one of a plurality of operation modes according to some example embodiments of the present inventive concepts.

FIG. 17 illustrates an example of a method in which the image sensor 100 or 200 operates in one of a plurality of operation modes according to some example embodiments of the present inventive concepts. Referring to FIGS. 1, 11, and 17, in operation S710, the image sensor 100 or 200 may receive mode information. For example, the host interface 139 or 239 of the image data translation circuit 130 or 230 of the image sensor 100 or 200 may receive the mode information from the external host device. The host interface 139 or 239 may write the mode information in the host register 138 or 238. The main processor 135 or 235 may read the mode information from the host register 138 or 238.

In operation S720, the image sensor 100 or 200 may perform mode determination. When the mode information indicates a first mode, in operation S730, the image sensor 100 or 200 may operate in an adaptive preparation time mode. In the adaptive preparation time mode, as described with reference to FIGS. 1 to 16, the image sensor 100 or 200 may adaptively adjust the preparation time, the timing to start the preparation operation, or the timing to end the preparation operation. In the adaptive preparation time mode, the image sensor 100 or 200 may cope with the setting information SI more quickly.

In operation S720, the image sensor 100 or 200 may perform mode determination. When the mode information indicates a second mode, in operation S740, the image sensor 100 or 200 may operate in a fixed preparation time mode. In the fixed preparation time mode, the execution time of the preparation operation may be set to the longest possible time (e.g., a worst case).

In operation S720, the image sensor 100 or 200 may perform mode determination. When the mode information indicates a third mode, in operation S750, the image sensor 100 or 200 may operate in a power saving mode. In the power saving mode, the image sensor 100 or 200 may increase a time corresponding to the setting information SI and may reduce power consumption of the image sensor 100 or 200, thereby improving operational efficiency and thus improving functionality of the image sensor 100 or 200.

Figure 18:
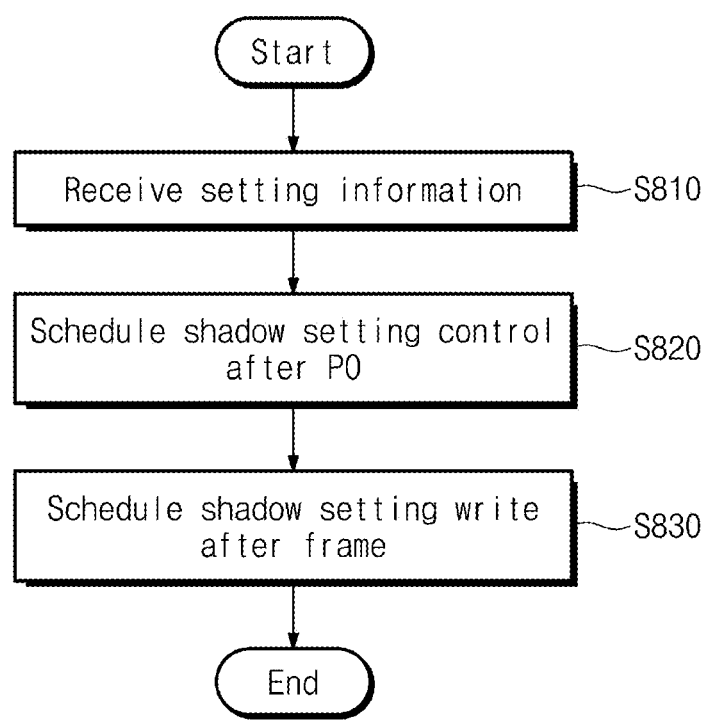
FIG. 18 illustrates an example of a method in which an image sensor operates in a power saving mode according to some example embodiments of the present inventive concepts.

FIG. 18 illustrates an example of a method in which the image sensor 100 or 200 operates in a power saving mode according to some example embodiments of the present inventive concepts. Referring to FIGS. 1, 11, and 18, in operation S810, the image sensor 100 or 200 may receive the setting information SI. Operation S810 may correspond to operation S210 of FIG. 6.

In operation S820, the image sensor 100 or 200 may schedule the shadow setting control after the preparation operation PO. Operation S820 may correspond to operation S260 of FIG. 6.

In operation S830, the image sensor 100 or 200 may schedule the shadow setting write operation after the frame interval. Operation S830 may correspond to operation S270 of FIG. 6.

That is, regardless of the timing when the image sensor 100 or 200 receives the setting information SI, settings according to the setting information SI may be updated through the shadow setting control SSC and the shadow setting write operation SSW.

Figure 19:
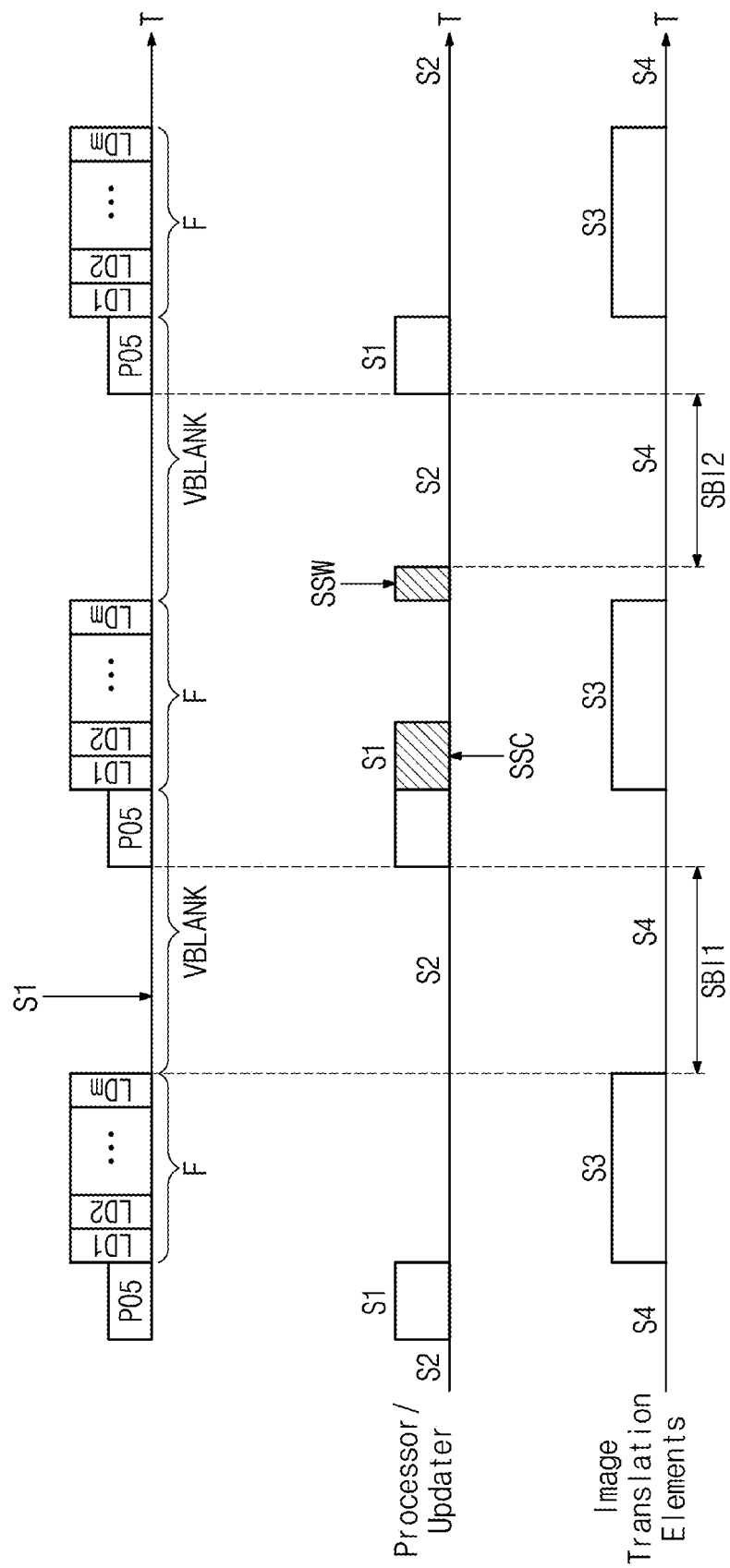
FIG. 19 illustrates an example in which power consumption is reduced by an operation in a power saving mode of FIG. 18 according to some example embodiments of the present inventive concepts.

FIG. 19 illustrates an example in which power consumption is reduced by an operation in a power saving mode of FIG. 18 according to some example embodiments of the present inventive concepts. In FIG. 19, a horizontal axis represents a time "T". An operation of the image sensor 100 or 200, a state of the main processor 135 or the updater 240, and a state of the image translation elements (e.g., including the image signal processor 132 or 232 and the output interface 133 or 233) over time are illustrated in FIG. 19.

Referring to FIGS. 1, 11, 18, and 19, even though the setting information SI is received in the vertical blank interval VBLANK before a fifth preparation operation PO5, the main processor 135 or 235 or the updater 240 may schedule the shadow setting control SSC and the shadow setting write operation SSW.

The fifth preparation operation PO5 may be the default preparation operation. After the fifth preparation operation PO5 is performed, the main processor 135 or 235 or the updater 240 may perform the shadow setting control SSC following the start of frame SOF. When the shadow setting control SSC is performed, settings and addresses corresponding to the settings may be stored in the shadow register 134 or 234.

In the vertical blank interval VBLANK following the end of frame EOF, the main processor 135 or 235 or the updater 240 may perform the shadow setting write operation SSW.

In some example embodiments, in the vertical blank interval VBLANK, the image translation elements may be in the fourth state S4 being a standby state. In the interval of the frame "F", the image translation elements may be in the third state S3 being an active state.

In the vertical blank interval VBLANK, the main processor 135 or 235 or the updater 240 may be in the first state S1 being an active state when performing the fifth preparation operation PO5 and the shadow setting write operation SSW and may be in the second state S2 being a standby state in the remaining interval. In the interval of the frame "F", the main processor 135 or 235 or the updater 240 may be in the first state S1 being an active state during performing the shadow setting control SSC and may be in the second state S2 being a standby state in the remaining interval.

Compared to FIGS. 7, 8, and 9, a length of an interval where the main processor 135 or 235 or the updater 240 is in the active state is relatively short. Accordingly, power consumption of the image sensor 100 or 200 may be reduced, thereby improving operational efficiency of the image sensor 100 or 200.

Also, in a first standby interval SBI1 when the shadow setting write operation SSW is not performed and in a second standby interval SBI2 when the shadow setting write operation SSW is performed, all of the main processor 135 or 235, the updater 240, and the image translation elements may be in the standby state. Accordingly, it is possible to power down the image data translation circuit 130 or 230 or to stop supplying a clock to the image data translation circuit 130 or 230. Accordingly, power consumption of the image sensor 100 or 200 may be reduced.

Figure 20:
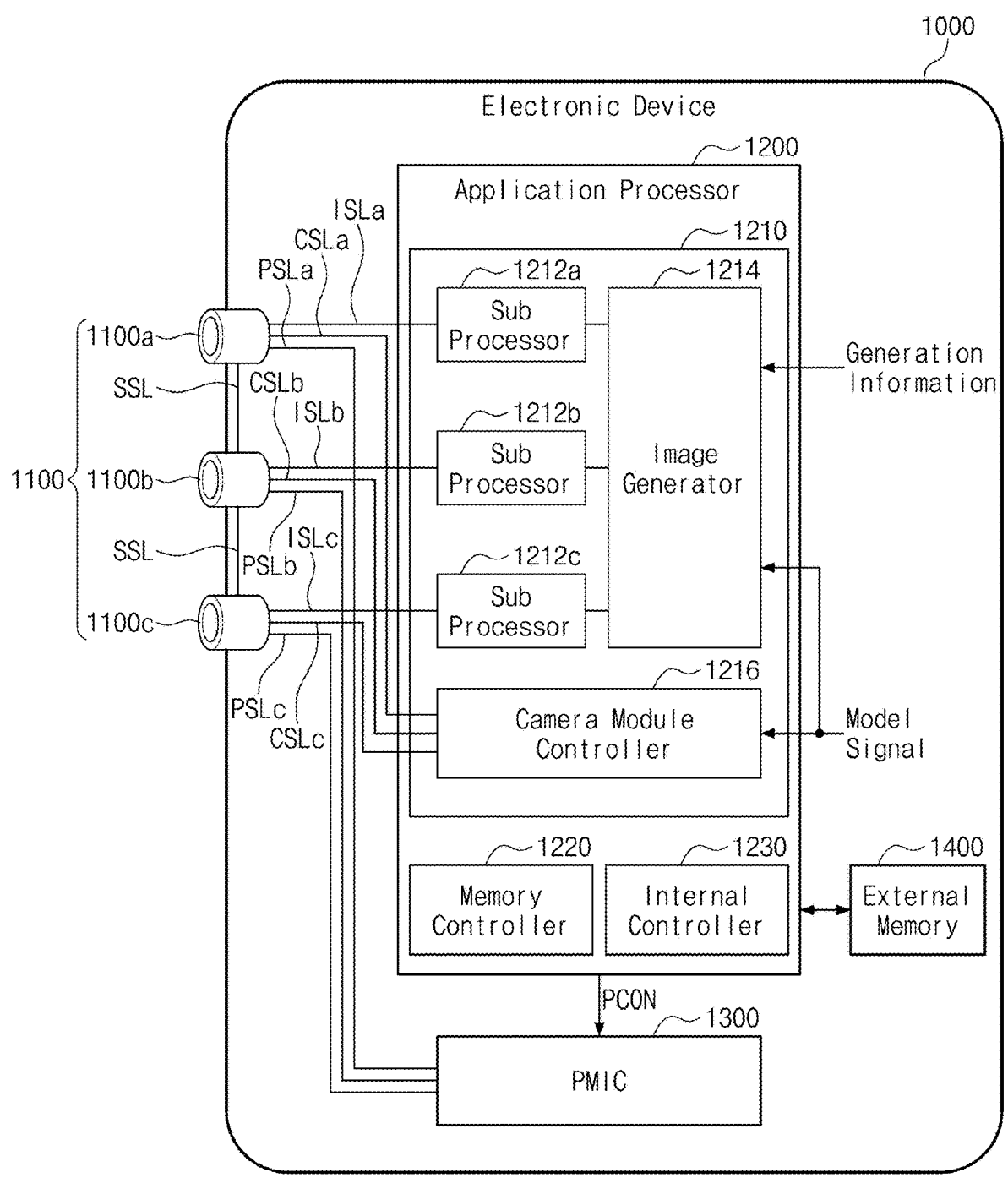
FIG. 20 is a block diagram of an electronic device including a multi-camera module according to some example embodiments of the present inventive concepts.
Figure 21:
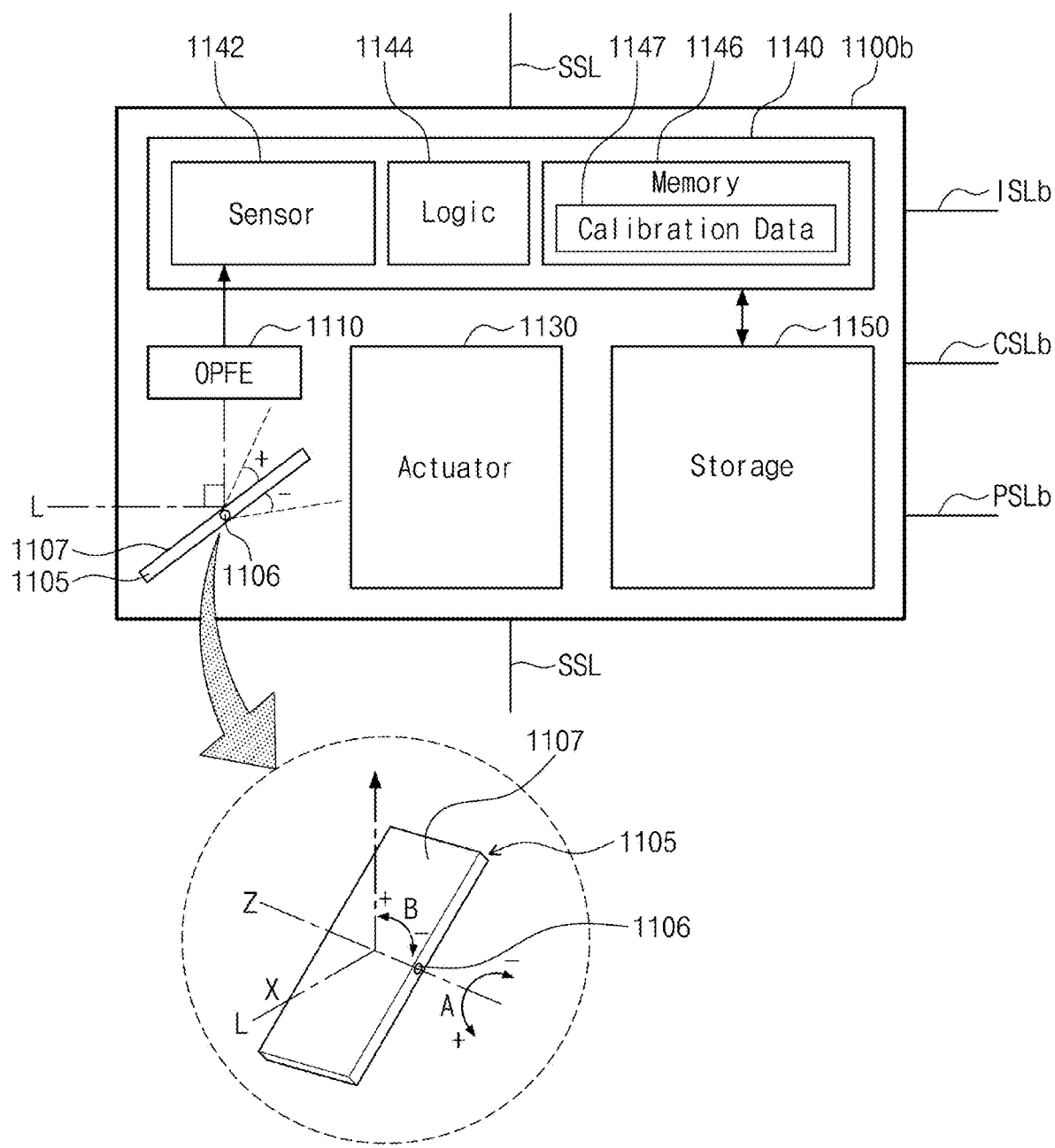
FIG. 21 is a block diagram illustrating a camera module of FIG. 20 in detail according to some example embodiments of the present inventive concepts.

FIG. 20 is a block diagram of an electronic device including a multi-camera module according to some example embodiments of the present inventive concepts. FIG. 21 is a block diagram illustrating a camera module of FIG. 20 in detail according to some example embodiments of the present inventive concepts.

Referring to FIG. 20, an electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 20, but the present inventive concepts are not limited thereto. In some example embodiments, the camera module group 1100 may be modified to include only two camera modules. Also, in some example embodiments, the camera module group 1100 may be modified to include "j" camera modules (j being a natural number of 4 or more).

Below, a detailed configuration of the camera module 1100b will be more fully described with reference to FIG. 21, but the following description may be equally applied to the remaining camera modules 1100a and 1100c.

Referring to FIG. 21, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some example embodiments, the prism 1105 may change a path of the light "L" incident in a first direction (X) to a second direction (Y) perpendicular to the first direction (X), Also, the prism 1105 may change the path of the light "L" incident in the first direction (X) to the second direction (Y) perpendicular to the first (X-axis) direction by rotating the reflecting plane 1107 of the light reflecting material in direction "A" about a central axis 1106 or rotating the central axis 1106 in direction "B". In this case, the OPFE 1110 may move in a third direction (Z) perpendicular to the first direction (X) and the second direction (Y).

In some example embodiments, as illustrated in FIG. 21, a maximum rotation angle of the prism 1105 in direction "A" may be equal to or smaller than 15 degrees in a positive A direction and may be greater than 15 degrees in a negative A direction, but the present inventive concepts are not limited thereto.

In some example embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some example embodiments, the prism 1105 may move the reflecting plane 1107 of the light reflecting material in the third direction (e.g., Z direction) parallel to a direction in which the central axis 1106 extends.

The OPFE 1110 may include optical lenses composed of "i" groups (i being a natural number), for example. Here, "i" lens may move in the second direction (Y) to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 7Z or more by moving "i" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens.

The control logic 1144 may control overall operations of the camera module 1100b. For example, the control logic 1144 may control an operation of the camera module 1100b based on a control signal provided through a control signal line CSLb.

The memory 1146 may store information, which is necessary for an operation of the camera module 1100b, such as calibration data 1147. The calibration data 1147 may include information necessary for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some example embodiments, the storage 1150 may be implemented with an electrically erasable programmable read only memory (EEPROM), but the present inventive concepts are not limited thereto.

Referring together to FIGS. 20 and 21, in some example embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some example embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, the present inventive concepts are not limited thereto.

In some example embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some example embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, but the present inventive concepts are not limited thereto.

Also, in some example embodiments, fields of view of the plurality of camera modules 1100a, 1100b, and 1100c may be different. In this case, the plurality of camera modules 1100a, 1100b, and 1100c may include different optical lens, not limited thereto.

In some example embodiments, the plurality of camera modules 1100a, 1100b, and 1100c may be disposed to be physically separated from each other. That is, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 16, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216.

The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present inventive concepts are not limited thereto.

Meanwhile, in some example embodiments, one sub image processor may be disposed to correspond to a plurality of camera modules. For example, the sub image processor 1212a and the sub image processor 1212c may be integrally implemented, not separated from each other as illustrated in FIG. 16; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on image generating information Generating Information or a mode signal.

In detail, the image generator 1214 may generate the output image by merging at least a portion of the image data respectively generated from the camera modules 1100a, 1100b, and 1100c having different fields of view, depending on the image generating information Generating Information or the mode signal. Also, the image generator 1214 may generate the output image by selecting one of the image data respectively generated from the camera modules 1100a, 1100b, and 1100c having different fields of view, depending on the image generating information Generating Information or the mode signal.

In some example embodiments, the image generating information Generating Information may include a zoom signal or a zoom factor. Also, in some example embodiments, the mode signal may be, for example, a signal based on a mode selected from a user.

In the case where the image generating information Generating Information is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation. In the case where the zoom signal is a second signal different from the first signal, without the image data merging operation, the image generator 1214 may select one of the image data respectively output from the camera modules 1100a, 1100b, and 1100c and may output the selected image data as the output image. However, the present inventive concepts are not limited thereto, and a way to process image data may be modified without limitation if necessary.

In some example embodiments, the image generator 1214 may generate merged image data having an increased dynamic range by receiving a plurality of image data of different exposure times from at least one of the plurality of sub image processors 1212a, 1212b, or 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, or 1100c may be designated as a master camera (e.g., 1100b) depending on the image generating information Generating Information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some example embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some example embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

The image sensor 1142 may include the image sensor 100 or 200 described with reference to FIGS. 1 to 19. For example, the image sensor 1142 may operate in one of the adaptive preparation time mode, the fixed preparation time mode, or the power saving mode (refer to FIG. 17). In the adaptive preparation time mode, the image sensor 100 or 200 may adaptively or dynamically adjust the preparation time based on the setting information SI and the preparation time table 137 or 237. The image sensor 100 or 200 may shift the execution interval of the preparation operation, for example, the timings to start and end the preparation operation, based on the setting information SI and latencies of the image translation elements. In the fixed preparation time mode, the image sensor 100 or 200 may determine the execution time of the preparation operation to be the longest possible time (e.g., a worst case). In the power saving mode, the image sensor 100 or 200 may increase a time corresponding to the setting information SI and may reduce power consumption (e.g., reduce power consumption by at least the image sensor 100 or 200).

As described herein, any devices, electronic devices, modules, units, and/or portions thereof according to any of the example embodiments, and/or any portions thereof (including, without limitation, the image sensor 100, the pixel array 110, the image data generation circuit 120, the row driver 121, the ramp signal generator 122, the analog-to-digital converter 123, the control circuit 124, the image data translation circuit 130, the bus 131, the image signal processor 132, he output interface 133, the shadow register 134, the main processor 135, the random access memory 136, the preparation time table 137, the host register 138, the host interface 139, the image sensor 200, the pixel array 210, the image data generation circuit 220, the row driver 221, the ramp signal generator 222, the analog-to-digital converter 223, the control circuit 224, the image data translation circuit 230, the bus 231, the image signal processor 232, the output interface 233, the shadow register 234, the main processor 235, the random access memory 236, the preparation time table 237, the host register 238, the host interface 239, the electronic device 1000, the camera module group 1100, the camera modules 1100a, 1100b, 1100c, the application processor 1200, the image processing device 1210, the image generator 1214, the sub image processors 1212a, 1212b, 1212c, the camera module controller 1216, the memory controller 1220, the PMIC 1300, the external memory 1400, the internal memory 1230, the actuator 1130, the image sensing device 1140, the control logic 1144, the image sensor 1142, the memory 1146, the calibration data 1147, the storage 1150, the OPFE 1110, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of any devices, electronic devices, modules, units, and/or portions thereof according to any of the example embodiments.

Any of the memories described herein, including, without limitation, the internal memory 1230, the external memory 1400, the memory 1146, and/or the storage 1150 may be a non-transitory computer readable medium and may store a program of instructions. Any of the memories described herein may be a nonvolatile memory, such as a flash memory, a phase-change random access memory (PRAM), a magneto-resistive RAM (MRAM), a resistive RAM (Re-RAM), or a ferro-electric RAM (FRAM), or a volatile memory, such as a static RAM (SRAM), a dynamic RAM (DRAM), or a synchronous DRAM (SDRAM).

In the above example embodiments, components according to the present inventive concepts are described by using the terms "first", "second", "third", etc. However, the terms "first", "second", "third", etc. may be used to distinguish components from each other and do not limit the present inventive concepts. For example, the terms "first", "second", "third", etc. do not involve an order or a numerical meaning of any form.

In the above embodiments, components according to embodiments of the present inventive concepts are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to some example embodiments of the present inventive concepts, an image sensor may adaptively adjust a time of a preparation operation based on a time necessary for changing settings. Accordingly, an image sensor reducing a time necessary for changing settings and an operating method of the image sensor are provided. Also, according to some example embodiments of the present inventive concepts, an image sensor may perform operations for changing settings in an active interval where a frame is processed. Accordingly, an image sensor reducing power consumption necessary for changing settings and an operating method of the image sensor are provided.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

While the present inventive concepts have been described with reference to some example embodiments thereof, it will be apparent to those of ordinary skill in the art that various changes and modifications may be made thereto without departing from the spirit and scope of the present inventive concepts as set forth in the following claims.

What is claimed is:

1. An image sensor, comprising:
a pixel array including a plurality of pixels;
an image data generation circuit configured to generate first image data based on signals of the plurality of pixels and to output the first image data; and
an image data translation circuit configured to generate second image data based on translating the first image data and to output the second image data to an external host device,
wherein the image data generation circuit is configured to operate in a vertical blank interval and a frame interval alternately and is configured to
not output the first image data during the vertical blank interval, and
output one frame of the first image data during the frame interval,
wherein the image data translation circuit is configured to perform a preparation operation associated with translating a frame of the first image data into a frame of the second image data in a next frame interval, the preparation operation performed during the vertical blank interval, and
wherein, when setting information is received from the external host device, the image data translation circuit is configured to adjust a timing to start a next preparation operation.

2. The image sensor of claim 1, wherein, when the setting information is received, the image data translation circuit is configured to advance the timing to start the next preparation operation.

3. The image sensor of claim 2, wherein, when the setting information is received, the image data translation circuit is configured to change settings of the image data generation circuit or the image data translation circuit based on the setting information during the next preparation operation.

4. The image sensor of claim 2, wherein
the image data translation circuit includes information indicating times necessary for changing settings of the image data generation circuit and the image data translation circuit based on using a look-up table, and
the image data translation circuit is configured to determine a degree to which the timing to start the next preparation operation is advanced, based on the look-up table and the setting information.

5. The image sensor of claim 1, wherein, when the setting information is received in the vertical blank interval before the next preparation operation starts and when the setting information is applicable to the image data generation circuit or the image data translation circuit in the next preparation operation based on adjusting the timing to start the next preparation operation, the image data translation circuit is configured to adjust the timing to start the next preparation operation.

6. The image sensor of claim 1, wherein, when the setting information is received in the vertical blank interval before the next preparation operation starts and when the setting information is incapable of being applied to the image data generation circuit or the image data translation circuit in the preparation operation even by adjusting the timing to start the next preparation operation, the image data translation circuit is configured to maintain the timing to start the next preparation operation.

7. The image sensor of claim 6, wherein
the image data translation circuit includes a shadow register bank, and
when the setting information is incapable of being applied to the image data generation circuit or the image data translation circuit in the preparation operation, the image data translation circuit is configured to write an update setting and an address of a storage of the image data generation circuit or the image data translation circuit, which is to be updated based on the setting information.

8. The image sensor of claim 7, wherein the image data translation circuit is configured to write the address and the update setting in the shadow register bank during the next frame interval.

9. The image sensor of claim 7, wherein the image data translation circuit is configured to write the update setting written in the shadow register bank in the image data generation circuit or the image data translation circuit, based on the address written in the shadow register bank during a next vertical blank interval.

10. The image sensor of claim 1, wherein, when the setting information is received in an interval where the preparation operation of the vertical blank interval is performed or the frame interval, the image data translation circuit is configured to maintain the timing to start the next preparation operation.

11. The image sensor of claim 1, wherein the image data translation circuit includes:
an image signal processor configured to receive the first image data from the image data generation circuit, to generate internal image data based on performing a compensation operation on the first image data based on first settings, and to output the internal image data;
an output interface configured to receive the internal image data and to generate the second image data based on performing a crop operation on the internal image data based on second settings;
a storage element configured to store a look-up table including information indicating a time necessary for updating each of the first settings, the second settings, and third settings to be applied for the image data generation circuit to generate the first image data; and
a main processor configured to adjust the timing to start the next preparation operation based on the setting information and the look-up table and to update at least one of the first settings, the second settings, or the third settings based on at least a portion of the setting information during the next preparation operation.

12. The image sensor of claim 11, wherein
the image data translation circuit further includes a shadow register bank and a direct memory access, the main processor is configured to write an address and update data in the shadow register bank based on at least another portion of the setting information, and when a next vertical blank interval starts, the direct memory access is configured to update at least one of the first settings, the second settings, or the third settings by using the update data based on the address.

13. The image sensor of claim 11, wherein the main processor is configured to:
calculate latencies necessary for the first image data to reach respective components of the image signal processor; and
delay the timing to start the next preparation operation based on the latencies.

14. The image sensor of claim 13, wherein a timing to end the preparation operation is later than a timing to start the next frame interval.

15. The image sensor of claim 1, wherein the image data translation circuit includes:
an image signal processor configured to receive the first image data from the image data generation circuit, to generate internal image data based on performing a compensation operation on the first image data based on first settings, and to output the internal image data;
an output interface configured to receive the internal image data and to generate the second image data based on performing a crop operation on the internal image data based on second settings;
a storage element configured to store a look-up table including information of a time necessary for updating each of the first settings, the second settings, and third settings to be applied for the image data generation circuit to generate the first image data;
a main processor configured to generate update requests for the first settings, the second settings, and the third settings based on the setting information; and
an updater configured to receive the update requests from the main processor, to adjust the timing to start the next preparation operation based on the update requests and the look-up table, and to update at least some of the first settings, the second settings, and the third settings based on at least a portion of the setting information during the next preparation operation.

16. The image sensor of claim 15, wherein
the image data translation circuit further includes a shadow register bank,
the updater is configured to write an address and update data in the shadow register bank based on at least another portion of the setting information, and
when a next vertical blank interval starts, the updater is configured to update at least one of the first settings, the second settings, or the third settings based on using the update data based on the address.

17. An image sensor, comprising:
a pixel array including a plurality of pixels;
an image data generation circuit configured to generate first image data based on signals of the plurality of pixels and to output the first image data; and an image data translation circuit configured to generate second image data based on translating the first image data and to output the second image data to an external host device,
wherein the image data generation circuit is configured to operate in a vertical blank interval and a frame interval alternately and is configured to
not output the first image data during the vertical blank interval, and
output one frame of the first image data during the frame interval,
wherein the image data translation circuit is configured to perform a preparation operation associated with translating a frame of the first image data into a frame of the second image data in a next frame interval, the preparation operation performed during the vertical blank interval,
wherein, when mode information is received from the external host device, the image data translation circuit is configured to enter one of a first mode or a second mode,
wherein, in the first mode, when setting information is received from the external host device, the image data translation circuit is configured to adjust a timing to start a next preparation operation, and
wherein, in the second mode, when the setting information is received from the external host device, the image data translation circuit is configured to maintain the timing to start the next preparation operation.

18. The image sensor of claim 17, wherein, in the second mode, the image data translation circuit is configured to perform a setting control operation, which is based on the setting information, in the frame interval and the vertical blank interval.

19. An operating method of an image sensor which includes a pixel array, an image data generation circuit, and an image data translation circuit, the operating method comprising:
generating, at the pixel array, signals;
generating, at the image data generation circuit, first image data from the signals of the pixel array; and
generating, at the image data translation circuit, second image data based on translating the first image data,
wherein the generating of the second image data includes
performing, at the image data translation circuit, a preparation operation in a vertical blank interval, and
receiving, at the image data translation circuit, the first image data in a frame interval and generating the second image data based on translating the first image data, based on the preparation operation,
wherein, when setting information is received from an external host device, the image data translation circuit is configured to adjust a timing to start the preparation operation.

20. The operating method of claim 19, wherein, when the setting information is received from the external host device, the image data translation circuit is configured to update settings of the image data generation circuit or the image data translation circuit during the preparation operation.

* * * * *